United States Patent [19]

Ikenoue et al.

[11] Patent Number: 4,992,882
[45] Date of Patent: Feb. 12, 1991

[54] PRINTER

[75] Inventors: Yoshikazu Ikenoue; Takashi Morikawa; Ikunori Yamaguchi, all of Osaka, Japan

[73] Assignee: Minolta Camera Kabushiki Kaisha, Osaka, Japan

[21] Appl. No.: 291,460

[22] Filed: Dec. 29, 1988

[30] Foreign Application Priority Data

Dec. 29, 1987 [JP] Japan .................................. 62-334024

[51] Int. Cl.⁵ ...................... H04N 1/29; G01D 15/14
[52] U.S. Cl. .................................... 358/300; 346/160
[58] Field of Search ................ 358/296, 300; 346/108, 346/160, 134; 355/308, 309, 311, 313

[56] References Cited

U.S. PATENT DOCUMENTS 4,933,772 12/1988 Ikenoue ............................... 358/300

FOREIGN PATENT DOCUMENTS 59-178871 10/1984 Japan .
60-48358 3/1985 Japan .

Primary Examiner—Bruce A. Reynolds
Assistant Examiner—Scott A. Rogers
Attorney, Agent, or Firm—Price, Gess & Ubell

[57] ABSTRACT

The disclosure is directed to a printer which is so arranged that a preliminary paper feeding is effected in the case of normal printing, and upon alteration of printing conditions, the preliminary paper feeding is automatically released, while, after alteration of the printing conditions, the preliminary paper feeding is again effected, and thus, a printer efficient in use has been presented, with an improved through-put in operation.

4 Claims, 21 Drawing Sheets

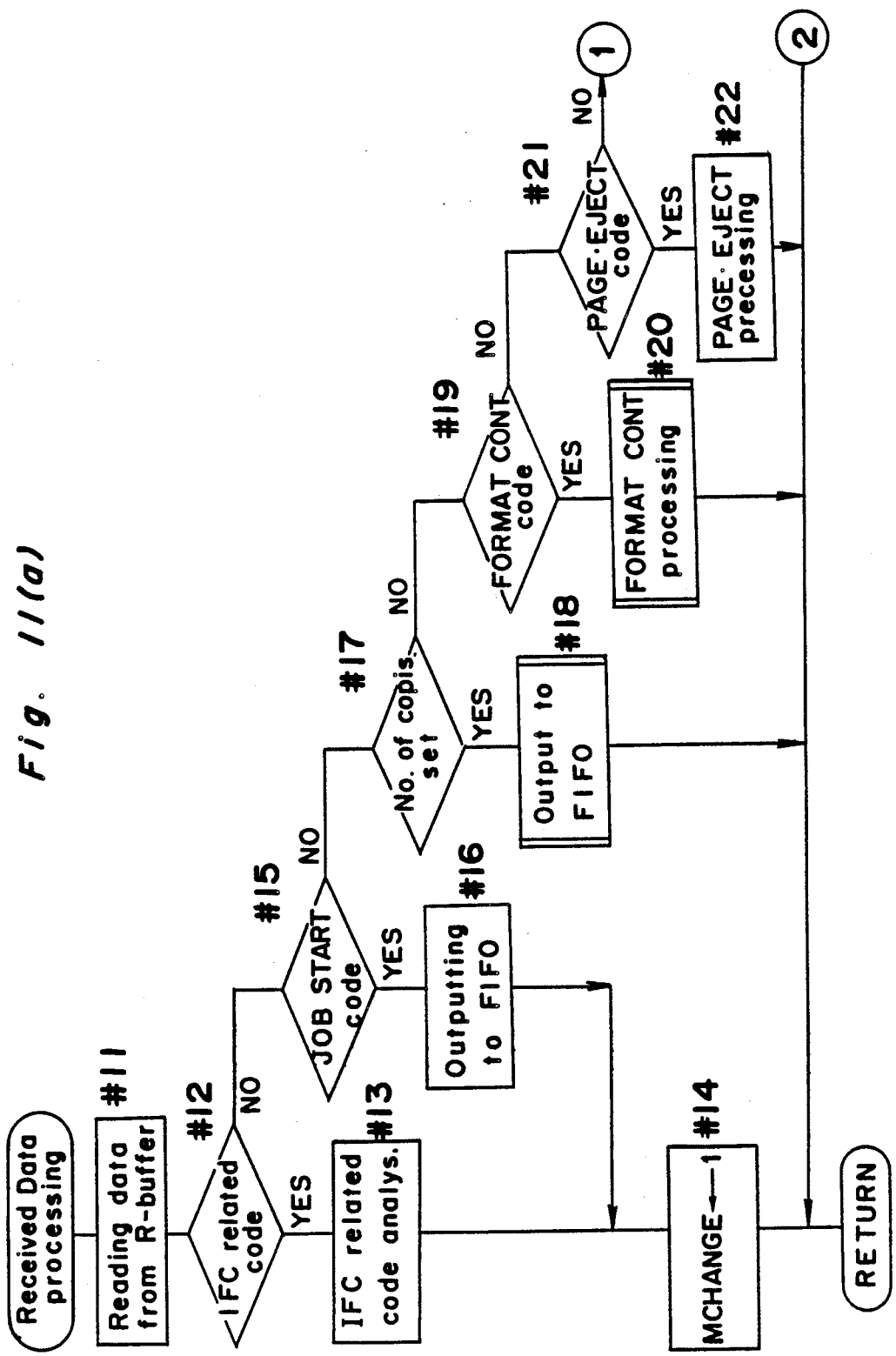

Fig. 21

```
(BMC interrupt) #361
        │
   [Data input] #362
        │
    #362
   <JOB START>──YES──[Renewal of mode info. temp. val.] #363──────────────┐
        │NO                                                                │
    #364                                                                   │
   <Mode info.?>──YES──[Memo in temp. area] #365────────────────────────┐ │
        │NO                                                              │ │
    #366                                                                 │ │
   <START CMD?>──YES──[START←1] #367──────────────────────────────────┐ │ │
        │NO                                                            │ │ │
    #368                                                               │ │ │
   <PRINT CMD?>──YES──[PRN←1] #369                                     │ │ │
        │NO                    │                                       │ │ │
        │                  #370<AF = 1>──YES──[ANOTER←1] #371──────┐  │ │ │
        │                      │NO                                  │  │ │ │
    #372                       └──────────────────────────────────┤  │ │ │
   <P.F. casset. desig?>──YES──[Memo. P.F. casset. code            │  │ │ │
        │NO                     in temp. area] #373────────────────┤  │ │ │
    #374                                                            │  │ │ │
   <Error info?>──YES──[Renewal of oper. panel disp. info.] #375───┤  │ │ │
        │NO                                                         │  │ │ │
        └──────────────────────────────────────────────────────────┴──┴─┴─┘
                                    │
                                (RETURN)
```

PRINTER

BACKGROUND OF THE INVENTION

The present invention generally relates to a printer for use in data processing, and more particularly, to a control arrangement for a printer for printing bit images according to data input from a data processor such as a host computer.

Generally, data fed from a data processor such as a host computer, etc. includes printing data representing an actual printing pattern and control data for controlling printing method and mode of a print engine of the printer. A control apparatus (referred to merely as a controller hereinafter) for the printer processes the data for transformation thereof into dot images or bit map images to be actually printed out and sends the bit map images to the print engine.

In order to improve processing capacity or through-put of a printer, it has been a conventional practice to adopt an advanced or preliminary paper feeding method which effects paper feeding for the printing of a next page during printing of a present page (referred to as preliminary paper feeding hereinafter). In this practice, however, when predetermined printing conditions are altered, it has been necessary to once suspend the printing. Otherwise, for example, when a paper feeding port is to be altered (i.e., when sizes or direction of paper sheets are to be changed), there has been such an inconvenience that the printing is undesirably made on a paper sheet of a size different from that originally intended, since the paper sheet has already been fed as referred to above. Meanwhile, in a printer which employs a sorter for controlling images to be printed for each sheet, there is a problem that the image being printed through is delayed by one page.

SUMMARY OF THE INVENTION

Accordingly, an essential object of the present invention is to provide a printer which is so arranged that a preliminary paper feeding is effected in the case of normal printing, and upon alteration of printing conditions, the preliminary paper feeding is automatically released. After alteration of the printing conditions, the preliminary paper feeding is again effected, thereby presenting a printer efficient in use, with an improved through-put in operation.

Another object of the present invention is to provide a printer of the above described type which is simple in construction, and stable in functioning at high reliability.

In accomplishing these and other objects, according to one preferred embodiment of the present invention, there is provided a printer which comprises a receiving means for receiving print data and control data, an analyzing means for analyzing the data received by said receiving means, a memory means for memorizing print image, an image writing means for writing image in said memory means according to the analysis result by said analyzing means, a printing means for effecting printing, an output means for outputting the print image stored in said memory means, a requesting means for requesting feeding of printing medium to be used for the printing means to effect output of said output means, and a control means having a first mode for starting said requesting means and said output means after completion of image writing by said image writing means, and a second mode for starting said requesting means before completion of the image writing by said image writing means and for starting said output means after completion of the image writing by said image writing means, and being so arranged that, in said second mode, the mode is temporarily changed over to said first mode by the output from said analyzing means so as to be again returned to said second mode upon termination of said output from said analyzing means.

In the above arrangement of the present invention, it is so controlled to effect the preliminary paper feeding at normal cases, which is to be automatically released when the printing conditions are altered, and to again effect the preliminary paper feeding after alteration of the printing conditions.

BRIEF DESCRIPTION OF THE DRAWINGS

These and other objects and features of the present invention will become clear from the following description taken in conjunction with the preferred embodiments thereof with reference to the accompanying drawings, in which:

FIGS. 15 to 18 are flow-charts representing respective routines to be executed by a second information processor; and FIGS. 19(a) to 22 are flow-charts representing respective routines by an interface controller.

DETAILED DESCRIPTION OF PREFERRED EMBODIMENT

Figure 1:
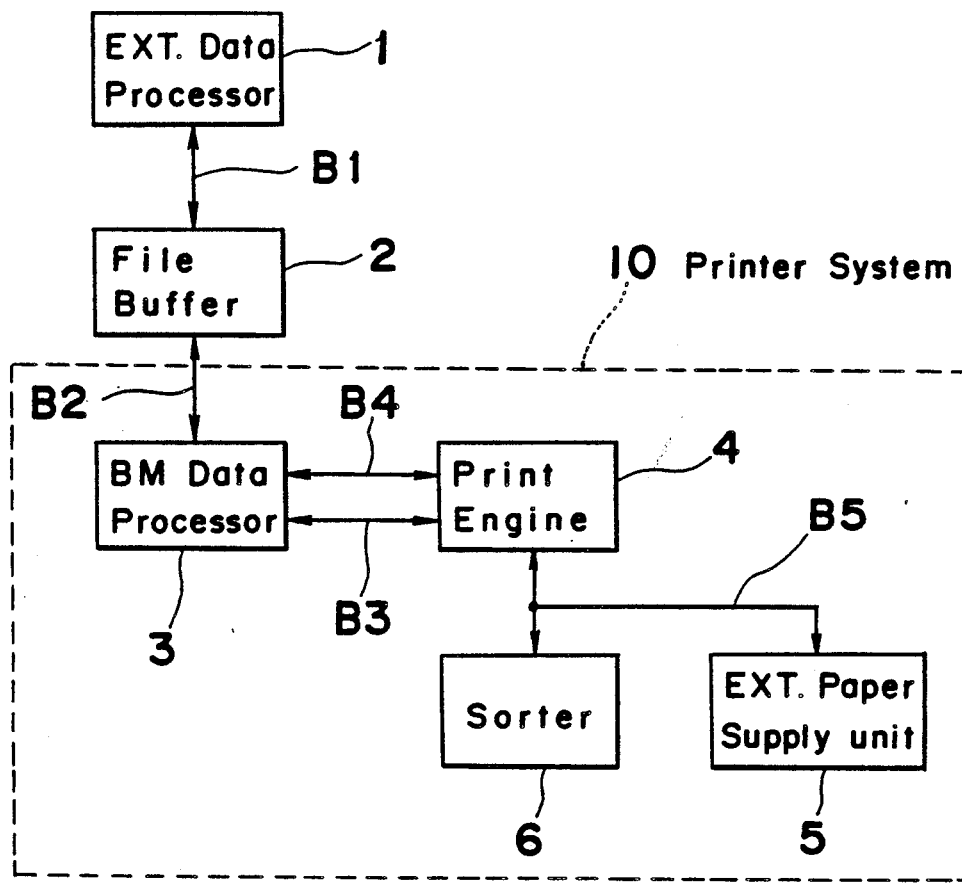
FIG. 1 is a block diagram showing general construction of a printer system according to one preferred embodiment of the present invention.

Before the description of the present invention proceeds, it is to be noted that like parts are designated by like reference numerals throughout the accompanying drawings.

(a) Composition of Electro-photographic Printer

FIG. 1 shows an image forming system including a printer system 10 according to the present invention.

Data from an external data processor 1 such as a host computer are once stored into an external file buffer 2 in order to improve through-put of the external data processor 1 and, thereafter, are outputted from the file buffer 2 to the printer system 10.

The printer system 10 includes a data processor 3 for processing a bit map memory, a print engine 4 including a laser means and an electro-photographic print means, and accessory apparatuses such as an external paper supply unit 5, a sorter 6 and the like.

Figure 2:
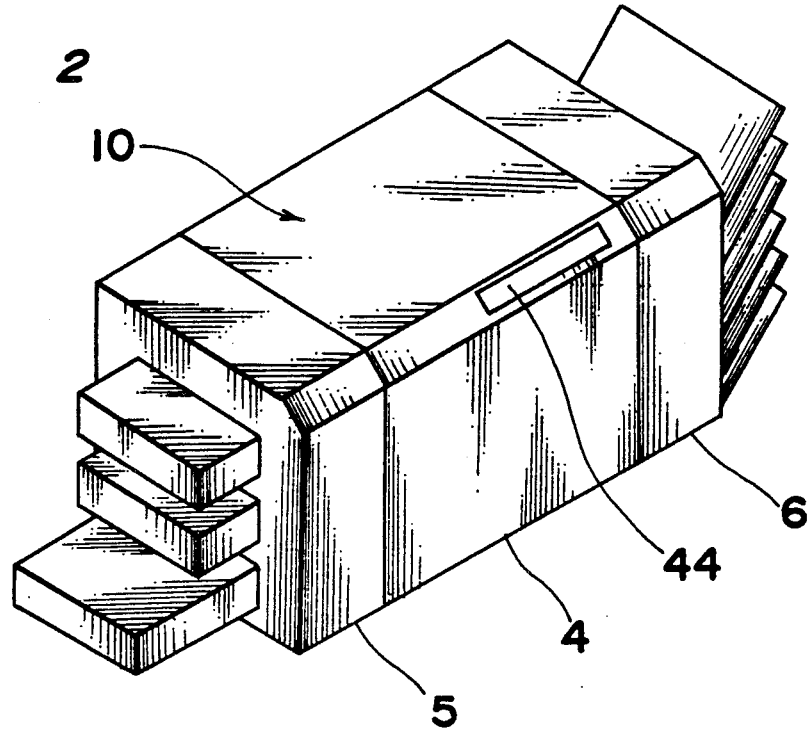
FIG. 2 is a perspective view of the printer according to the preferred embodiment of the present invention.

FIG. 2 is a perspective view of the printer system 10.

The print engine 4 installs the bit map data processor 3 therein and the external paper supply unit 5 and the sorter 6 are assembled to the print engine 4. On a front edge portion of the upper surface of the body of the print engine 4, there is provided an operation panel or control panel 44 having display means for displaying various indications regarding the printer system and a key means for inputting data and/or commands.

Figure 3:
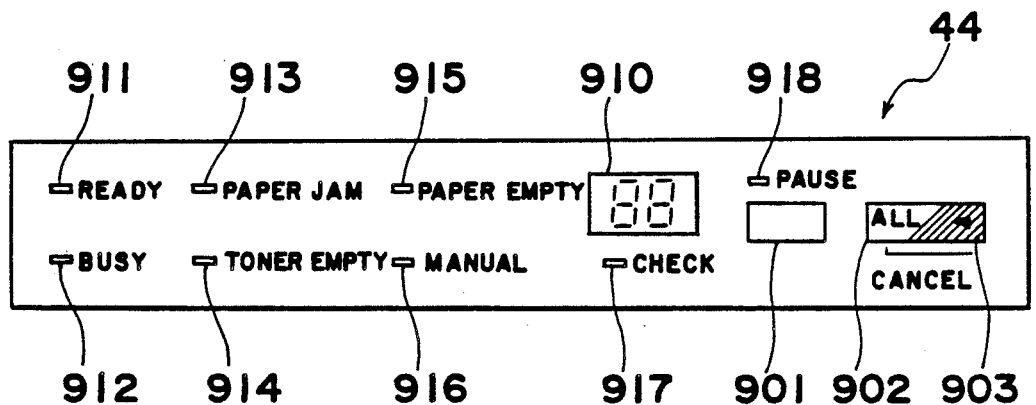
FIG. 3 is a top plan view of an operation panel of the printer shown in FIG. 2.

FIG. 3 shows a top plan view of the operation panel 44. On the operation panel 44, entry keys 901 to 903 and indicators 910 to 918 are arranged. The key 901 is a PAUSE key for stopping a printing operation temporarily. The key 902 is a TEST key for performing a test printing operation. The key 903 is a SHIFT key and becomes a CANCEL key for stopping a printing operation when it is pushed down together with the TEST key 902. The reason why the CANCEL function becomes effective only when both of keys 902 and 903 are pushed down at the same time is to avoid an undesirable cancel by a careless operation.

Figure 4:
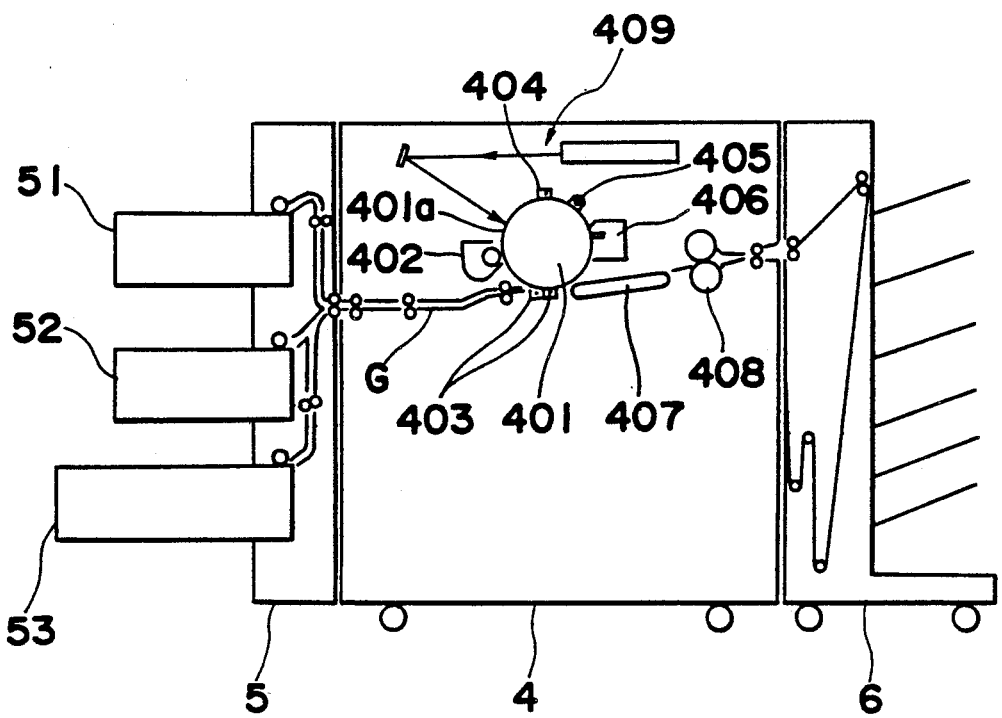
FIG. 4 is a schematic side sectional view of the printer system of/the present invention.

FIG. 4 is a schematic side sectional view of the printer system 10 showing a paper feeding passage G formed therein, and the paper sheets are arranged to be selectively fed in the passage G from three paper feeding cassettes 51, 52, and 53 detachably mounted on the paper supply unit 5. Within the print engine 4, generally at its central upper portion, there is rotatably provided a photosensitive or photoreceptor drum 401 having a photoconductive layer 401a formed on its peripheral surface, around which there are sequentially disposed various processing stations such as a corona charger 404, a developing device 402, a transfer charger 403, a cleaner 406 and an eraser lamp 405, etc.

After removal of residual toner and charges by the cleaner 406 and the eraser lamp 405, the photoconductive surface 401a of the photoreceptor drum 401 is uniformly charged by the corona charger 404 so as to be exposed to an image through an optical system 409 for the formation of an electrostatic latent image on said surface 401a. The latent image thus formed is then developed into a visible toner image by the developing device 402. The toner image is subsequently transferred onto a copy paper sheet fed through the paper feeding passage G by the transfer charger 403, and the copy paper sheet having the transferred image is transported to a fixing device 408 via a transport belt, and after fixing of 407. After the image is affixed to the copy paper sheet thereonto by the fixing device 408, accommodated into the sorter 6.

Figure 5:
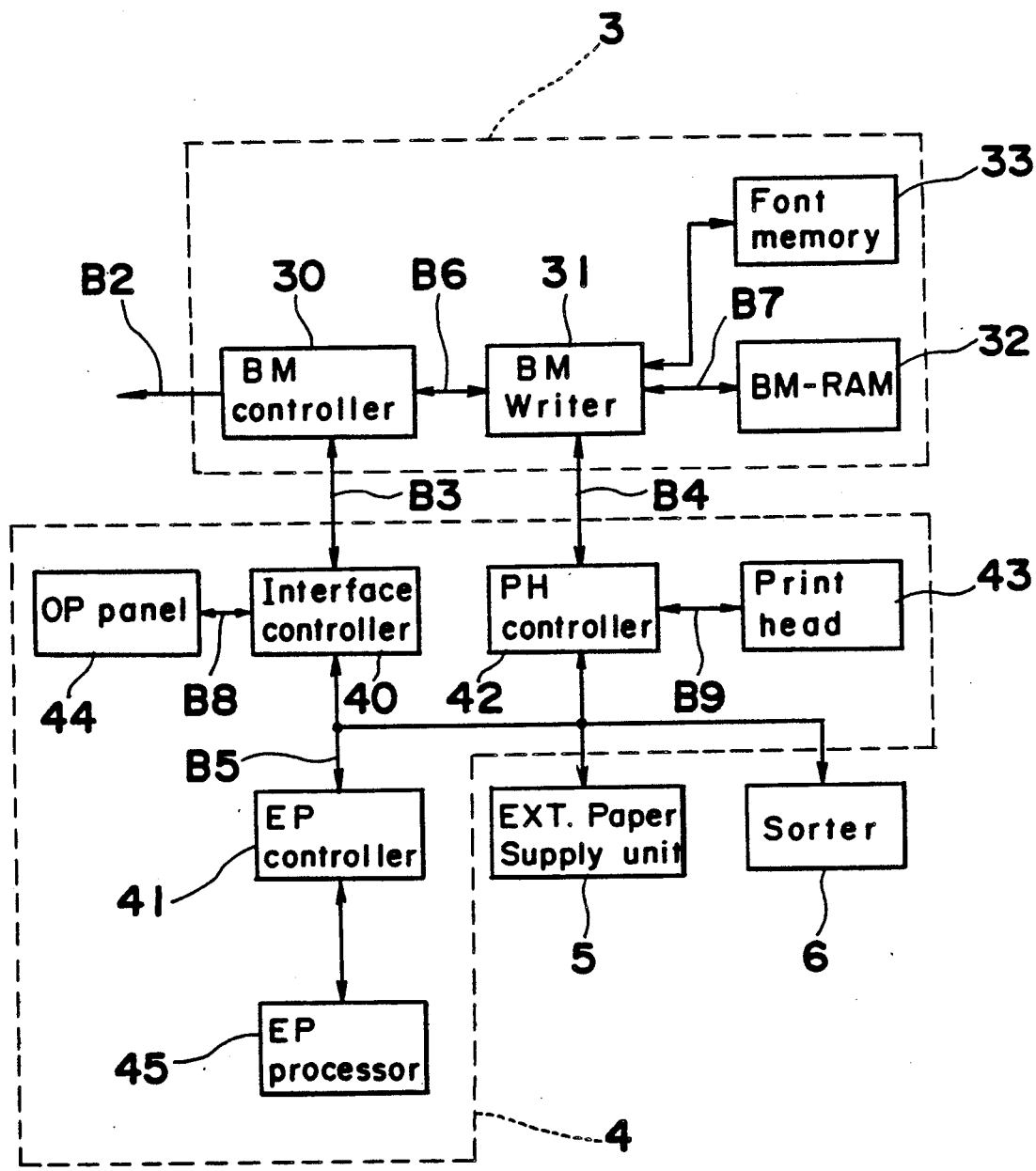
FIG. 5 is a block diagram showing a bit map type data processor and a print engine shown in FIG. 1.

FIG. 5 is a block diagram of the printer system 10.

The bit map data processor 3 includes a bit map controller (BMC) 30, a bit map random access memory (BM-RAM) 32, a bit map writer (BMW) 31 for imaging bit images on the BM-RAM 32 and a font memory means 33 coupled to each other as shown. Communication between the bit map data processor 3 and the print engine 4 is done through a bus means B3 for control data such as a number of prints, a accessory control signal and the like and a bus means B4 for image data.

The print engine 4 further includes an interface controller 40, an electro-photographic process controller 41 and a print head controller 42. The interface controller (IFC) 40 performs processing of control data from the bit map controller 30, control of the operation panel 44 and timing control of the print engine 4 through an internal bus B5. The electro-photographic process controller 41 controls an electro-photographic processor 45 according to data sent from the interface controller 40 through the internal bus B5. The print head controller (PHC) 42 controls a semiconductor laser and a polygon mirror (not shown) provided in a print head 43 according to information sent from the IFC 40 through the internal bus B5 in order to write image data sent from the BMW 31 through the internal bus B4. Also, the external paper supply unit 5 and the sorter 6 are controlled, through the internal bus B5, by the IFC 40.

As is apparent from the above description, the printer system 10 is a kind of laser printer of bit map type. Print data [being usually represented by codes] sent from the external data processor 1 are developed as dot images on the BM-RAM 32 of the bit map data processor 3 and, then, outputted to the print engine 4. The print engine 4 writes dot images on the photoconductive layer 401a of the drum 401 by controlling the laser means according to data sent from the bit map data processor 3 and transfers written dot images onto a blank paper according to the electro-photographic process as is well known to those skilled in the art.

Data sent from the external data processor 1 includes codes for control of print format and codes for setting respective modes of the print engine 4 other than character or image data. The bit map data processor 3 analyzes protocols of these codes other than character codes and outputs commands for print format control, for supplying a blank paper to the print engine 4, for alteration of mode of the accessory and the like according to the result of the protocol analysis. The print engine 4 performs various controls such as control of electro-photographic system, timing control of a paper, controls in synchronous with a paper feeding toward the sorter 6 besides the recording control referred to above. These controls are similar to those of an electro-photographic copy machine except control of scanning system needed.

(b) Bit Map Controller

Figure 6:
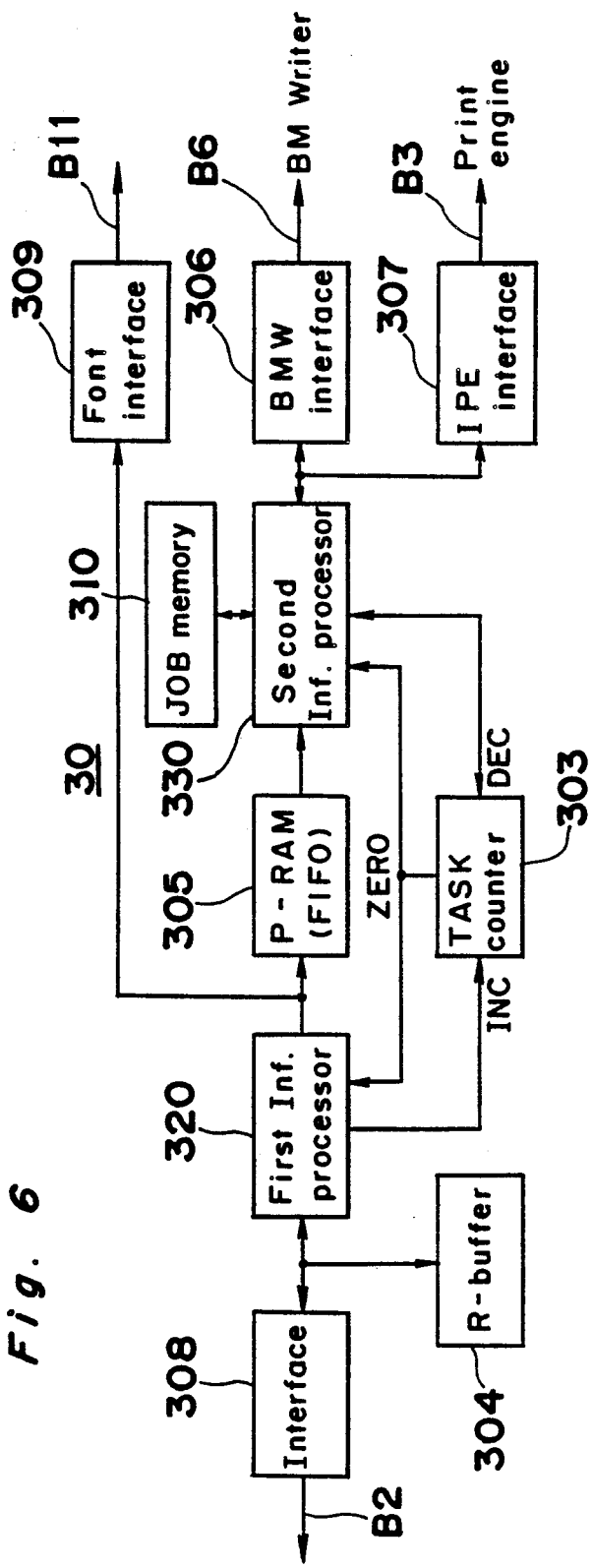
FIG. 6 is a block diagram showing a bit map controller shown in FIG. 5.

FIG. 6 shows a block diagram of the bit map controller 30 (FIG. 5) according to the present invention.

The first information processor 320 is processing for data from the interface 308 stored temporarily in a R-buffer 304 in asynchronous with data entry. Protocol analysis, pre-edition of image data into intermediate codes which are intended to make imaging into the BM-RAM 32 easier and storing intermediate codes into the P-RAM 305 are performed per sheet. In the pre-edition of image data, respective print positions of individual image data are determined according to the result of the protocol analysis. Therefore, every intermediate code includes a pattern code of the image data and an address on the BM-RAM 32 at which a dot image corresponding to the intermediate code is to be formed.

On the contrary to the above, the second information processor 330 reads stored intermediate codes from the P-RAM 305 which is of FIFO type and is referred to as FIFO 305 hereinafter to process them. It outputs control commands for the print engine 4 corresponding to intermediate codes to the print engine interface 307, it also outputs intermediate codes other than control commands, for the print engine to the bit map writer interface 306.

Figure 8:
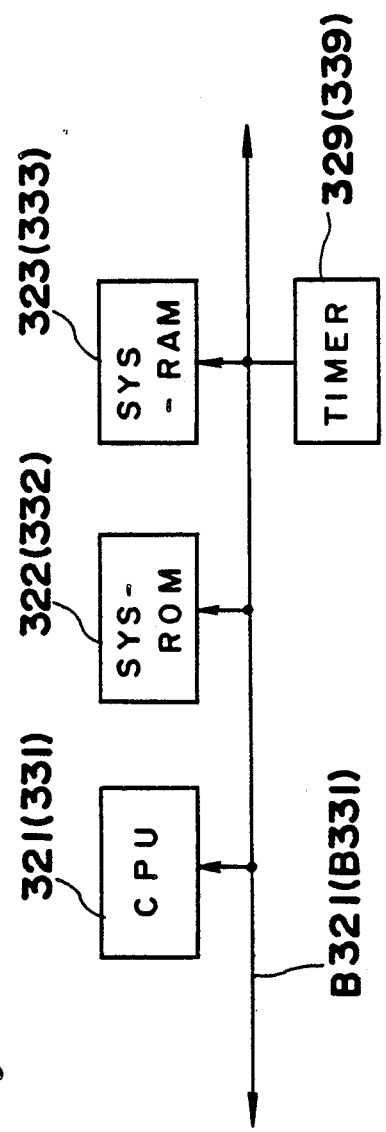
FIG. 8 is a block diagram showing a composition for first and second information processors shown in FIG. 6.

FIG. 8 shows an example of hard-ware structure for the first and the second information processors 320 and 330. Each of the information processors includes a CPU 321 (331), a system ROM 322 (332) memorizing programs for CPU 321 (331), a system RAM 323 (333) to be used for working memory area and a timer 329 (339) for enabling CPU 321 (331) to control timing.

In FIG. 6, a TASK counter 303, is connected between the first and second information processors 320 and 330 so as to show how many pages of the page information including PAGE.EJECT code indicative of sections for the page information are stored in the FIFO 305, and is arranged to count up each time the page information is outputted from the first information processor 320 to the FIFO 305, and to count down each time such information is derived from the second information processor 330. The symbol ZERO in FIG. 6 shows that the counter value is of "0".

Figure 7:
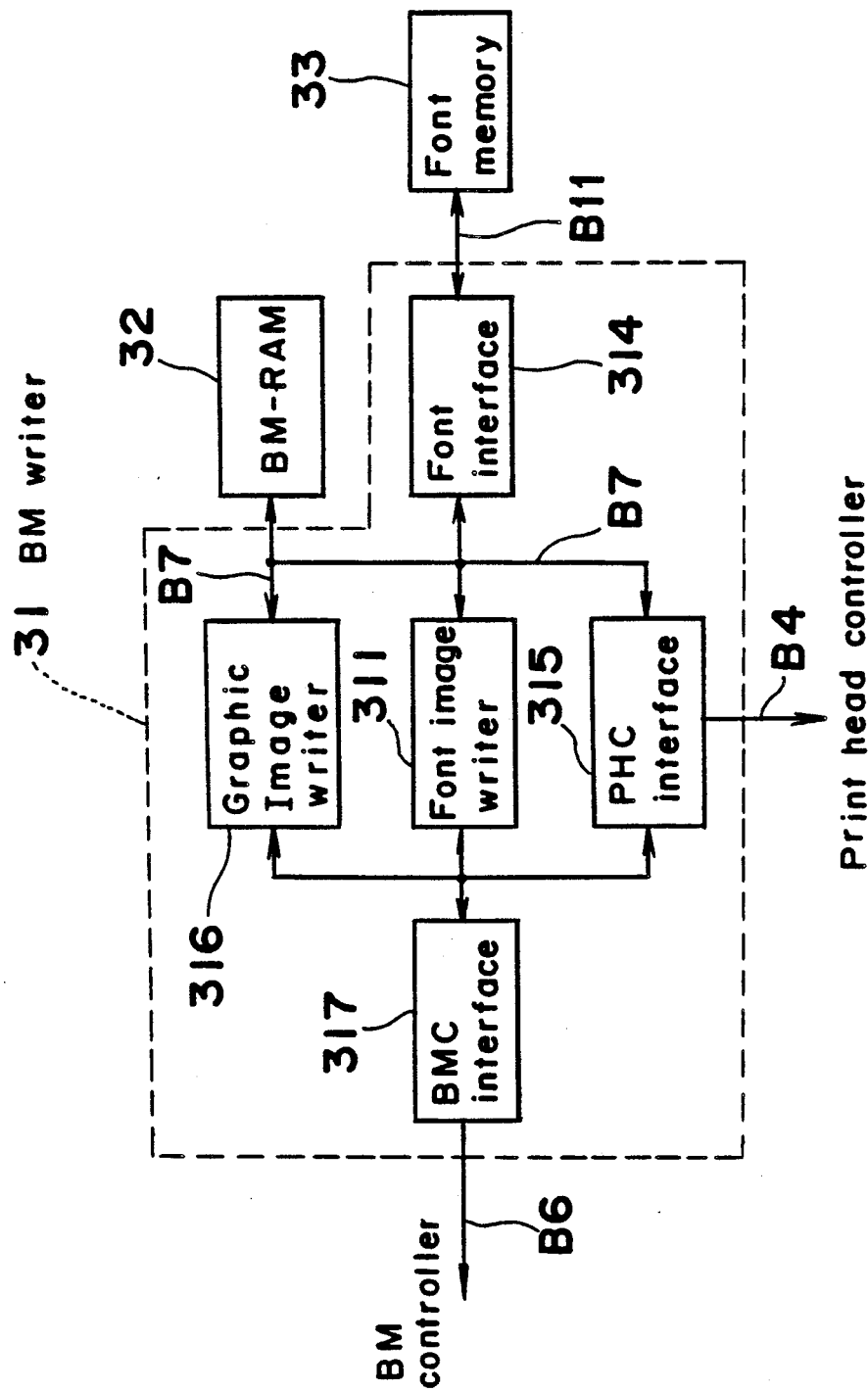
FIG. 7 is a block diagram of a bit map writer shown in FIG. 5.

FIG. 7 shows a general construction of the BIT MAP WRITER 31.(FIG. 5)

Functions of the bit map writer 31 are generally classified into an imaging function onto the BM-RAM 32 and an outputting function for outputting data in the BM-RAM 32 to the print engine 4 upon printing.

The imaging function is further divided into an imaging function for imaging lines and/or circles which is executed by a graphic image writer (GIW) 316 and an imaging function for imaging characters which is executed by a font image writer (FIW) 311. Both of the graphic and font image writers 316 and 311 are operated according to packets sent from the bit map controller 30 through a bit map controller (BMC) interface 317. The graphic image writer 316 usually writes bit images on the BM-RAM 32 according to results obtained by analyzing parameters included in a packet, while the font image writer 311 usually writes front images on the BM-RAM 32 which are read from the font memory 33 through a font memory interface 314 according to data in the FIFO 305.

On the contrary, the output function for outputting data upon printing is executed by a print head controller interface 315. Namely, when it receives a PRINT START code sent from the bit map controller 30 through the bit map controller interface 317, it outputs data in the BM-RAM 32 to the print head controller 42 in synchronous with synchronized signals sent from a control circuit of the print head controller 42 through the bus B4.

Figure 9:
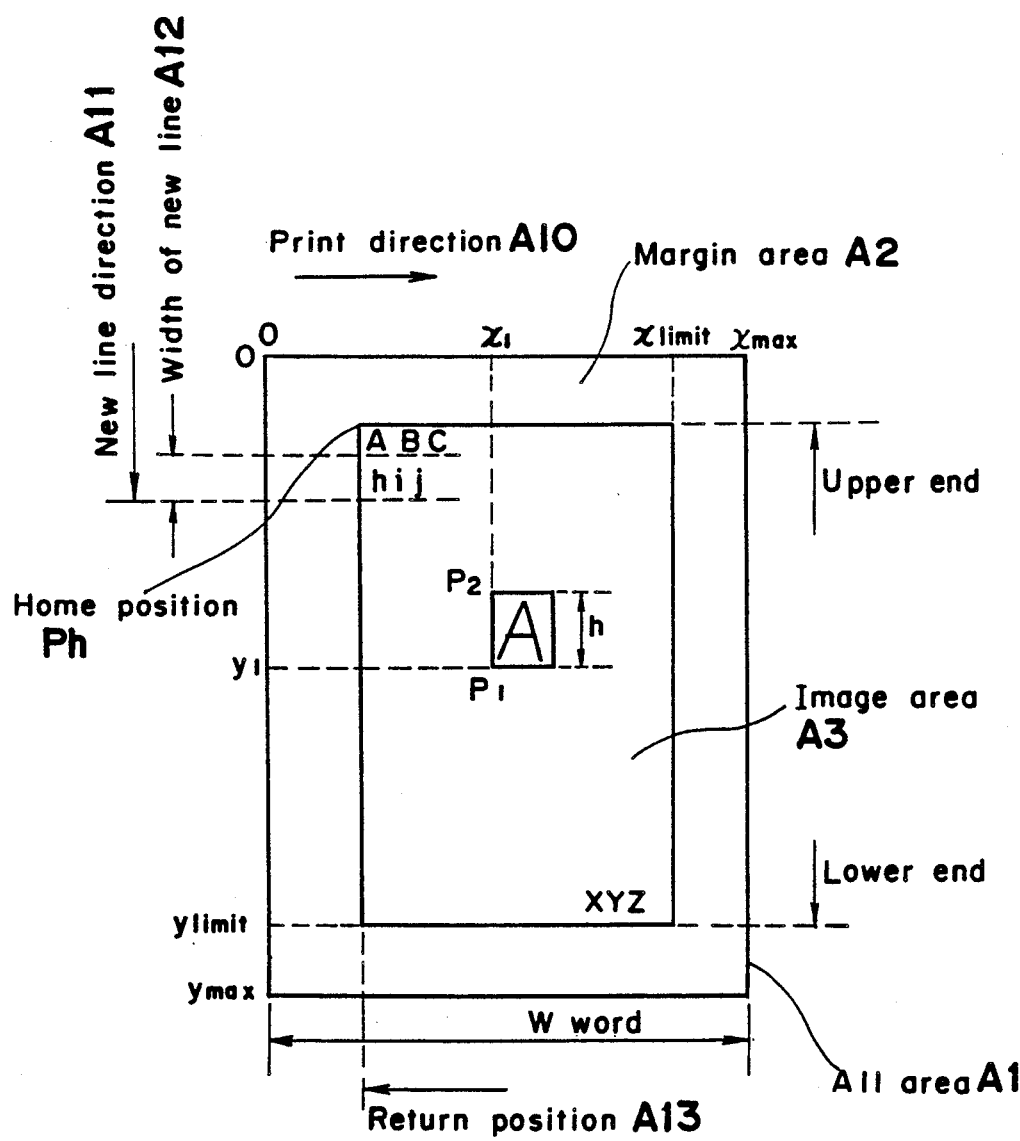
FIG. 9 is a diagram for explaining the image area and writing address.

FIG. 9 shows an example of an image area.

Whole area A1 corresponding to a paper size is an area provided on the BM-RAM 32. A margin area A2 is an area to be left blank upon printing and an image area A3 is an area in which dot images are to be printed.

The print is started from a left upper corner of the image area A2 and is proceeded in a printing direction A10. When a NEW LINE code is input, the next print position is moved by a line width A12 set for a new line in a new line direction A11. It is to be noted here that the orientation of the paper sheet has nothing to do with the paper passing direction, and the scanning direction of laser.

(c) Routine by 1st information processor

Hereinafter, operations of the printer system will be described according to flow charts shown in FIGS. 10 to 22.

In the printer system according to the present invention, two main routines are executed parallel by the first and second information processors 320 and 330, respectively.

FIGS. 10 to 15 are flow charts of routines to be executed by the first information processor 320 of the bit map controller 30.

Figure 10:
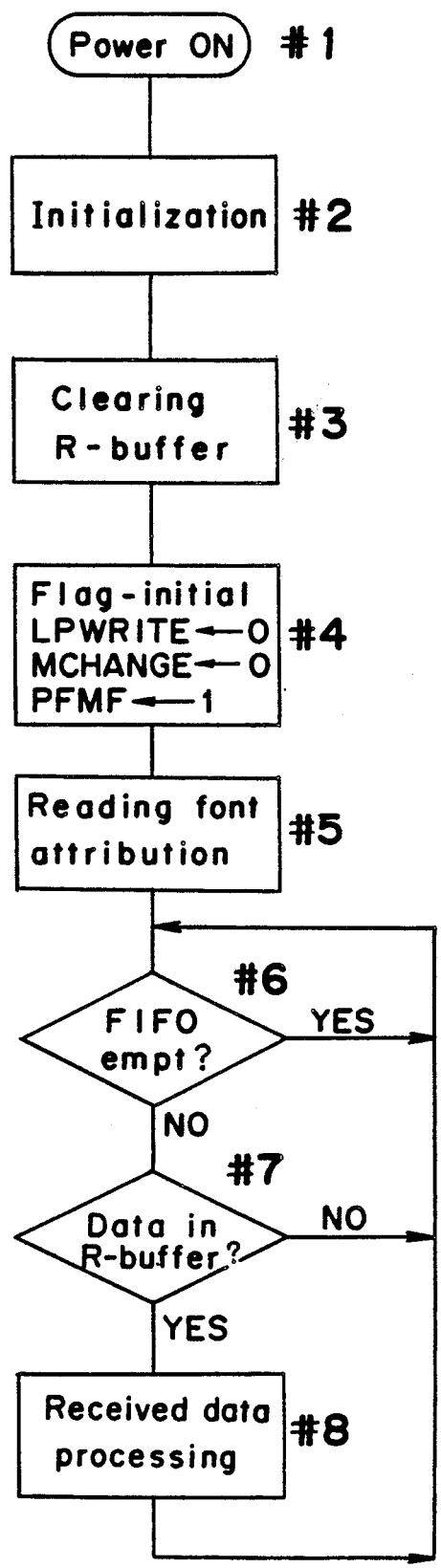
FIGS. 10 to 15 are flow-charts representing respective routines to be executed by a first information processor.

Referring to FIG. 10, when the power source is turned on at Step #1, the first information processor 320 is initialized internally at Step #2 and, then, the R-buffer 304 for storing data received from the external data processor 1 is cleared at Step #3. Also, a control flag is initialized at Step #4. Concretely, an LPWRITE flag for indicating "pre-editing stage" in a received data processing routine and MCHANGE showing the change of print mode are cleared, while PFMF for allowing the preliminary paper feeding is set (Default is allowed). Then, at Step #5, a font attribution is read from the font memory 33 in preparation for transformation into intermediate codes in order to determine a font format of characters to be printed.

After completion of these preparation operations, the process enters into a main lop including Steps #6, #7 and #8. In this main loop, analysis of received data and transformation into intermediate codes are executed. At first, data sent from the external data processor 1 are stored in the R-buffer 304 by an interruption routine (See FIG. 14) for receiving data which is started in asynchronous with the main loop by a REQUEST command from the data processor interface 308. If the FIFO 305 is not full (YES at step #6) and there are data in the R-buffer 304, these received data are transformed into intermediate codes by a RECEIVED DATA PROCESSING routine (Step #8 and see FIG. 11) to store transformed intermediate codes in the FIFO 305. In other words, the first information processor 320 transfers data processing, via the FIFO 305, to the second information processor 330 in the style of intermediate codes. These intermediate codes include respective values of write addresses for the BM-RAM 32 which are calculated according to selected font pattern and font size and, accordingly, they are deemed as pre-edited data.

The reason why the font attribution is read at Step #5 is to pre-edit data in asynchronous with imaging of characters executed by the second information processor 330.

<Received data processing>

Figure 11B:
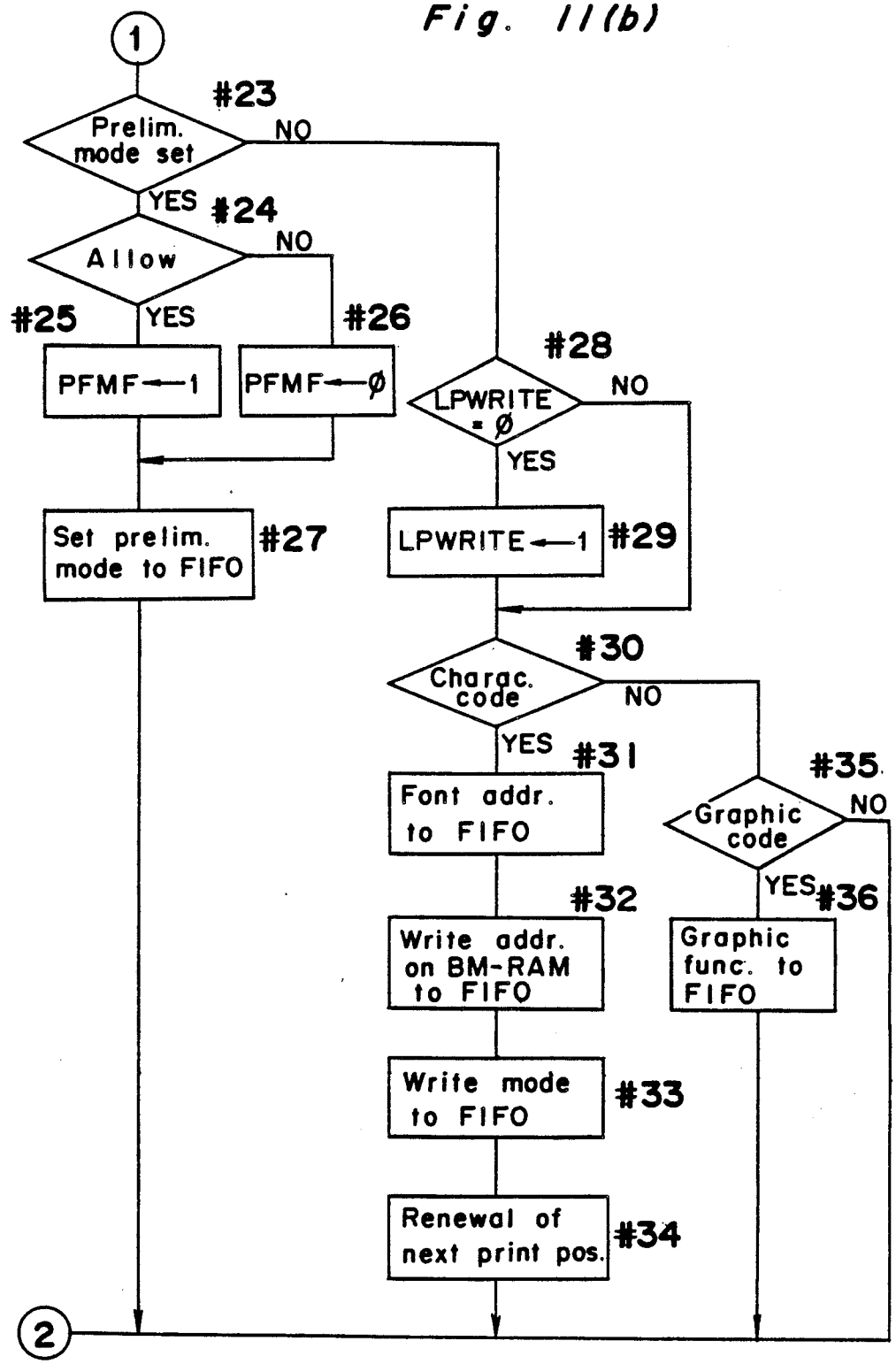

FIGS. 11(a) and 11(b) show flow charts for the RECEIVED DATA processing (Step #11).

At first, each received data stored in the R-buffer 304 is read therefrom and the kind of the code is identified at Step #11. If the data is of an IFC related code (Step #12) including alteration of paper sheets or optional items, it is outputted to the FIFO 305 after judgment at the first information processor 320 (Step #13, FIG. 13), while in the case of JOBSTART (Step #15) and the number of copies setting (Step #17), the data is outputted to the FIFO (Steps #16, #18). However, in the case of the IFC related code and JOBSTART code, an MCHANGE flag is set (Step #14) for starting the processing to temporarily suspending the preliminary paper feeding control mode. For a format control code such as alteration of image writing position (Step #19) and PAGE.EJECT code (Step #21) showing termination of a page, processings for the respective sub-routines (Steps #20, #22) are effected.

The preliminary paper feeding mode setting (Step #23) is intended to alter from the host data processor the set value which has been set for the default (Step #4) during initialization, and after re-setting of PFMF (Steps #24 to #26), the data is outputted to the FIFO 305 (Step #27) for notification to the second information processor 330.

Codes other than the above are regarded as character or graphic codes, and converted into packets according to the font attribution read upon turning on the power supply. For a specific converting procedure, the font address in the pattern corresponding to the character code thereof is first applied to the FIFO 305 (Step #31), and writing addresses to the BM-RAM 32 are successively applied to the FIFO 305 (Step #32), with the writing mode to the BM writer 31 being outputted (Step #33). Finally, according to the SIZE of the present font, etc., the writing address for the next font to the BM-RAM 32 is renewed (Step #34).

Referring back to FIG. 9, there is shown a calculating method for the writing address.

In FIG. 9, the image writing position is memorized as a cursor position $P_1(x_1, y_1)$, and the address for the cursor may be obtained as a corresponding memory address on the BM-RAM. Further, owing to the hardware structure, the address not for $P_1$, but for $P_2$ is outputted. For the calculation of the address, the memory size width direction of the present image and the number of lines h for the image to be written are required.

In the case of graphic code (Step #35), the format is converted to that for the graphic image writer 316 so as to be outputted to the FIFO 305 (Step #36). By the above processing, the format for the final print result is determined.

Different from the actual editing and image writing to the BM-RAM 32, the above processing may be regarded as an imaginary pre-editing.

Meanwhile, to effect image writing of the leading character on a page (Step #28), an LPWRITE flag indicating starting of the pre-editing is set (Step #29).

Figure 12:
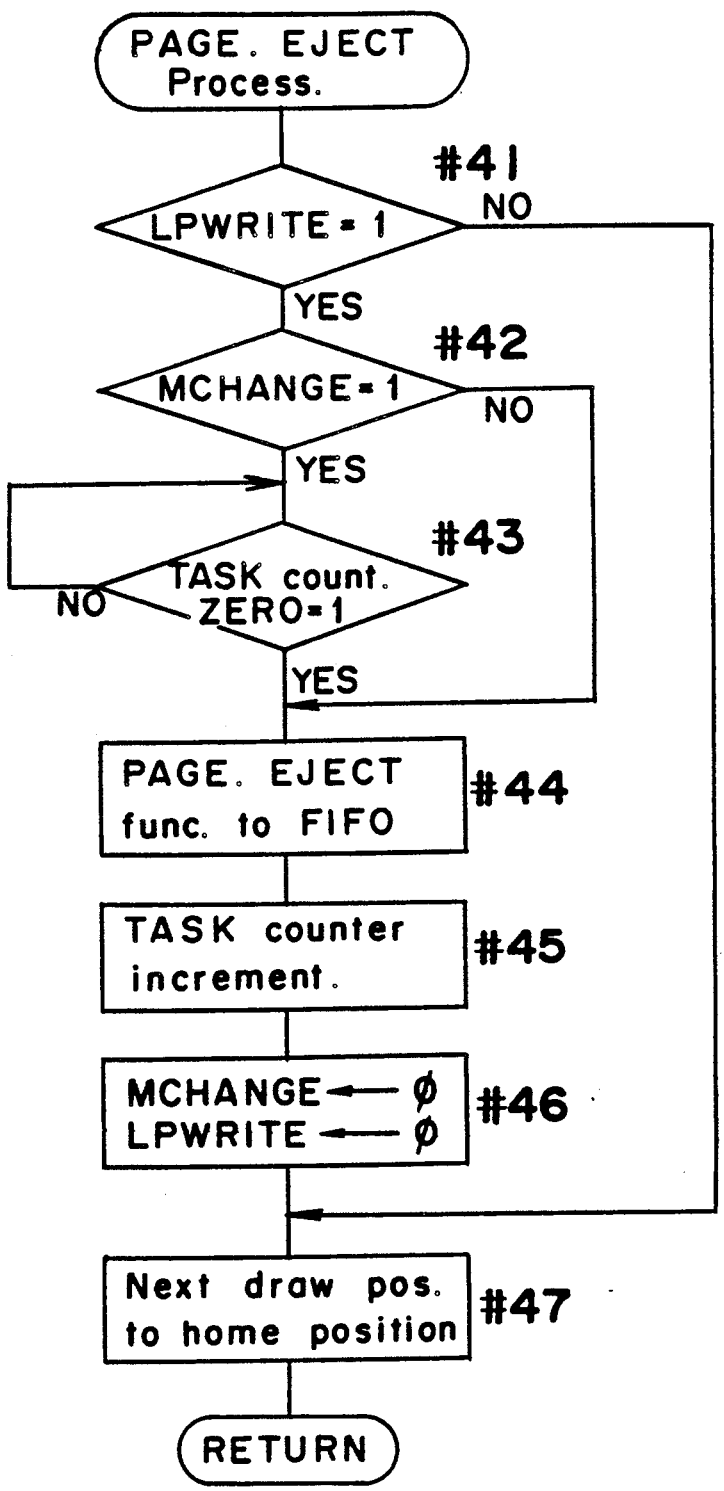

Reference is further made to FIG. 12 showing a subroutine for PAGE.EJECT processing.

In this routine, even when PAGE.EJECT code is detected, in the case of a blank paper sheet (LPWRITE =0), subsequent processings are not executed to prevent the page eject (Step #41).

Moreover, even in the case where the page eject request processing is to be executed, if the mode related to the print engine is altered (MCHANGE=1, Step #42), waiting is effected until the present TASK counter, i.e. page information within the FIFO 305 becomes empty (ZERO=1, Step #43). This is due to the fact that the page including the present PAGE.EJECT code can not be subjected to the preliminary feeding processing for some reason such as change of paper feeding cassettes etc. Meanwhile, processing may be executed irrespective of the possibility for the preliminary feeding mode, since the actual processing is effected at the second information processor.

For the page eject request processing, an intermediate code requesting PAGE.EJECT is applied to the FIFO 305 (Step #44), and the TASK counter 303 is incremented (Step #45), with the two flags being cleared (Step #46). At last, the next image writing position is returned to the home position, in preparation for a subsequent pre-editing.

Figure 13:
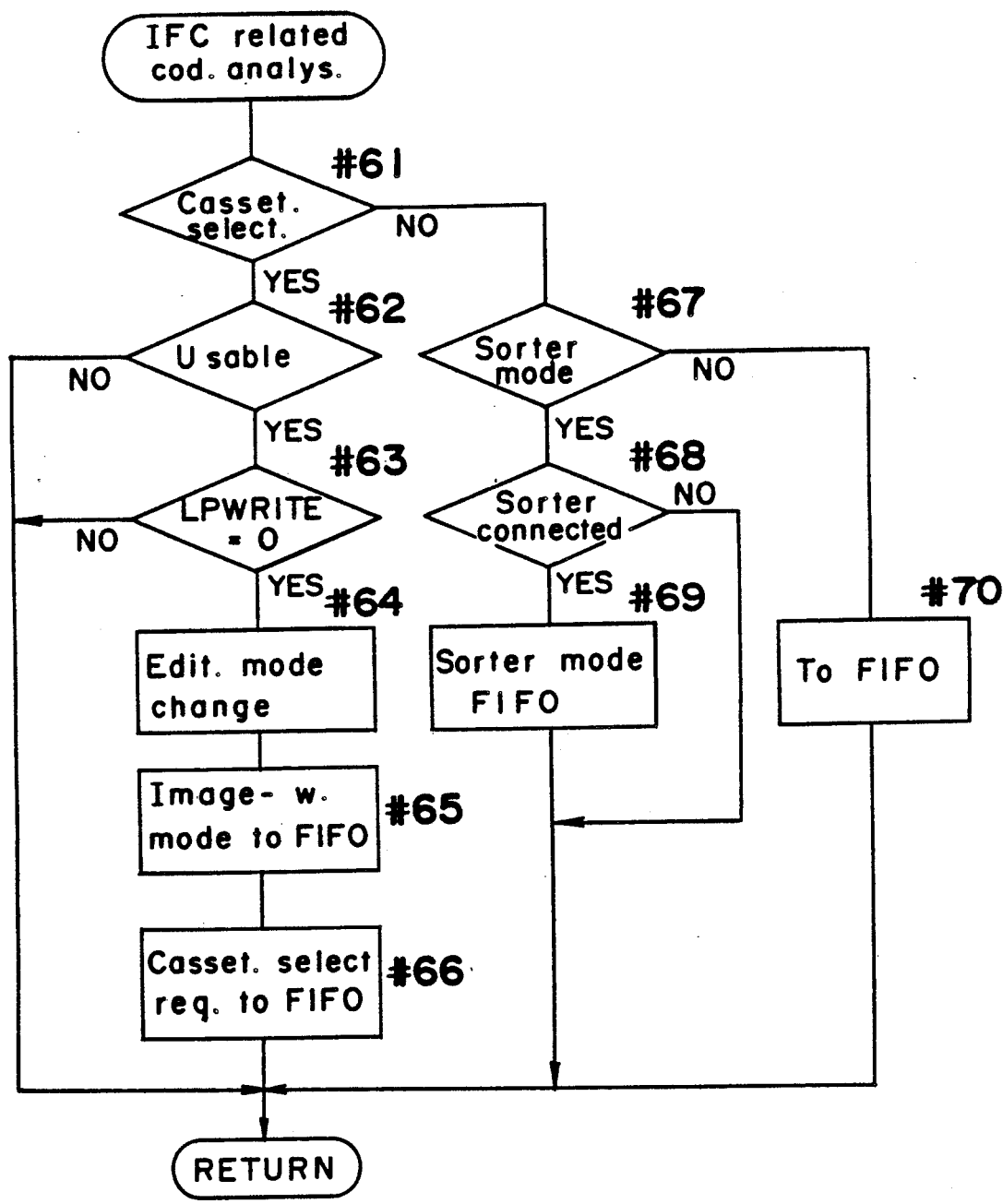

FIG. 13 shows a flow-chart for analysis of IFC related codes in the data from the host processor.

In the case of cassette select (Step #61), availability is checked according to the paper feeding cassette information of the print engine 4 applied from the print engine interface 307 and that of the external paper supply unit 5 (Step #62), and if it is usable but without preediting (LPWRITE =0), alteration is effected (Step #63).

More specifically, the parameters as shown in FIG. 9 are altered (Step #64), and output is given to the FIFO for alteration of operating mode of the BM write also (Step #65), while the IFC related code for requesting alteration of the cassette is applied to the FIFO 305.

With respect to the mode for the sorter 6 also (Step #67), the sorter mode is outputted to the FIFO (Step #69) after checking of connection (Step #68).

Codes other than the above are applied to the FIFO 305 as the FC related codes unconditionally (Step #70).

<Format control code processing>

Figure 14:
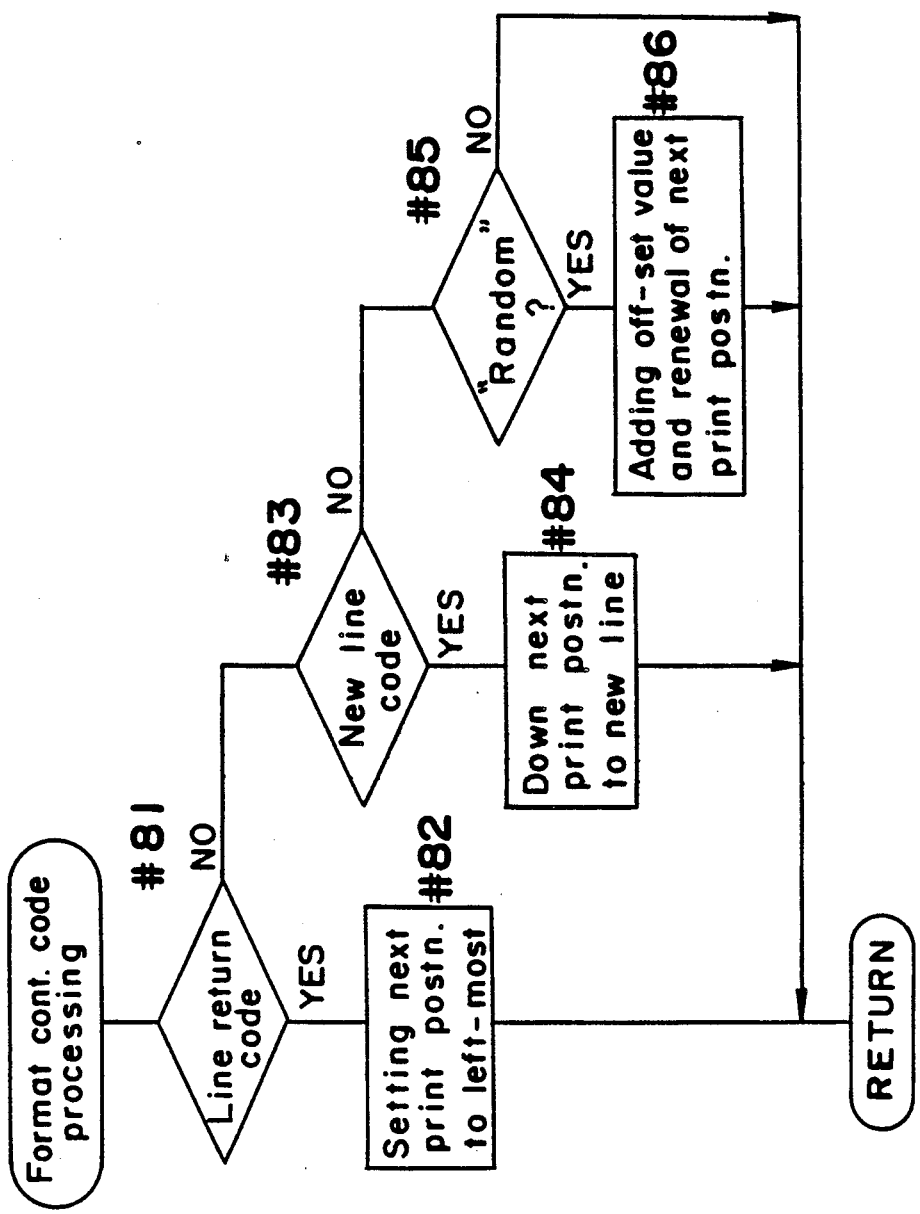

FIG. 14 shows a flow chart for FORMAT CONTROL CODE processing at Step #20 of FIG. 11(a).

If the code data is a LINE RETURN code at Step #81, the next print position is moved to the left-most position A13 of the image area A3 at Step #82. If the code data is a NEW LINE code at Step #83, the next print position is moved down by one line at Step #84. If the code data is a RANDOM DESIGNATION code at Step #85, the next print position is renewed by adding an off-set value at Step #86.

Figure 15:
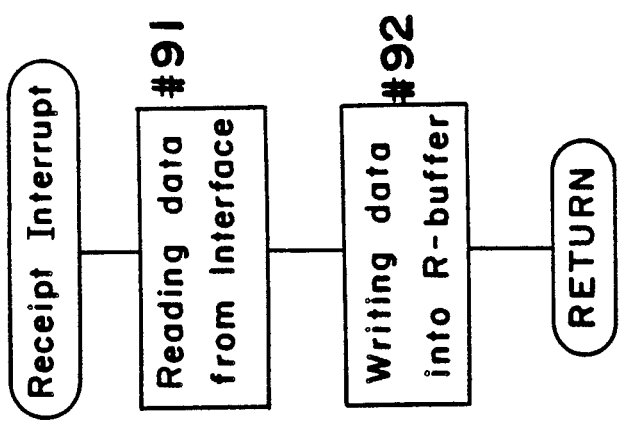

FIG. 15 shows an interruption routine to be executed upon data receipt.

When an interruption signal is input from the external data processor 1, data are read from the data processor interface 308 at Step #91 and, then, the data are written into the R-buffer 304 (Step #92).

<Routine by 2nd information processor>

Figure 16:
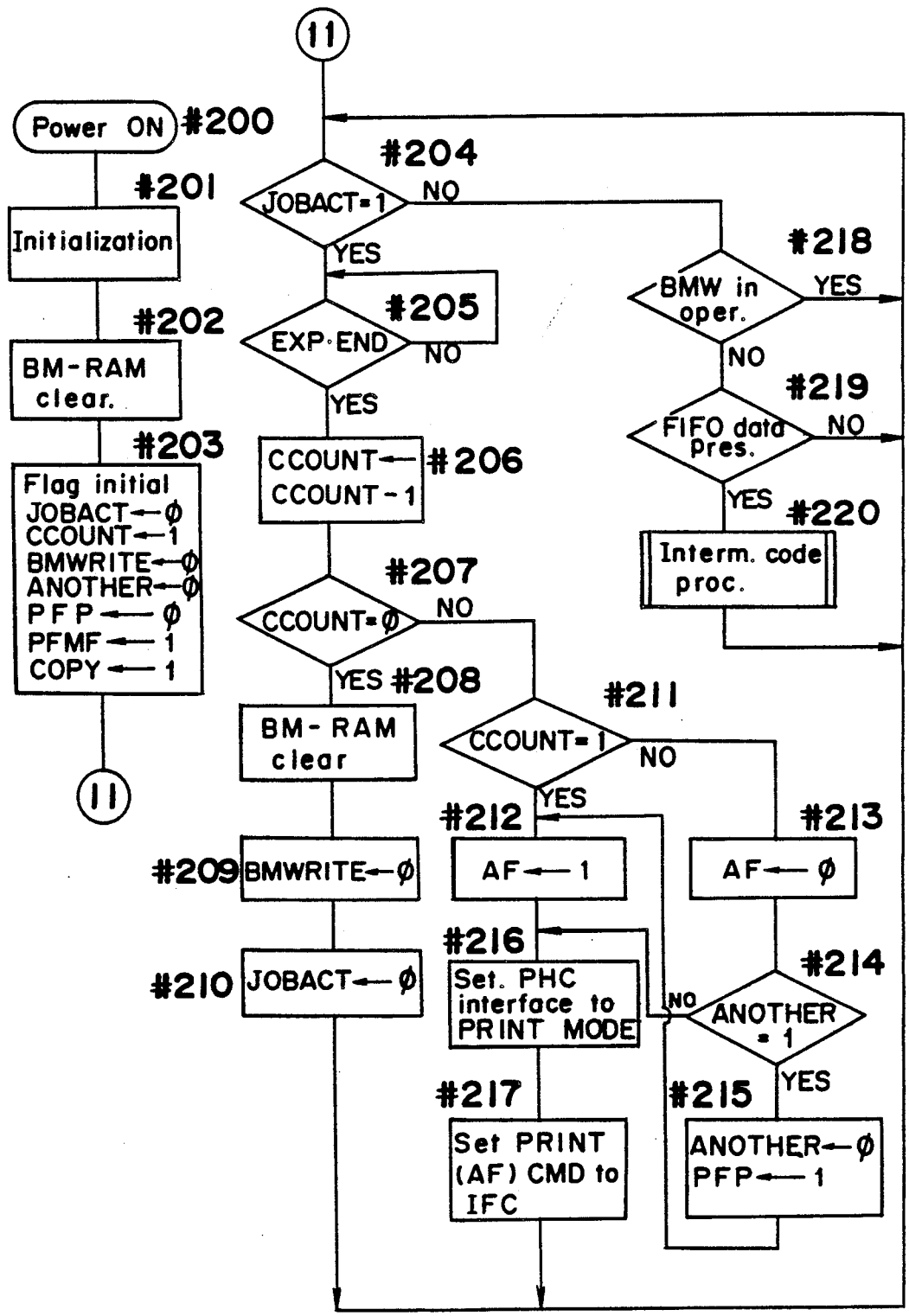
Figure 17A:
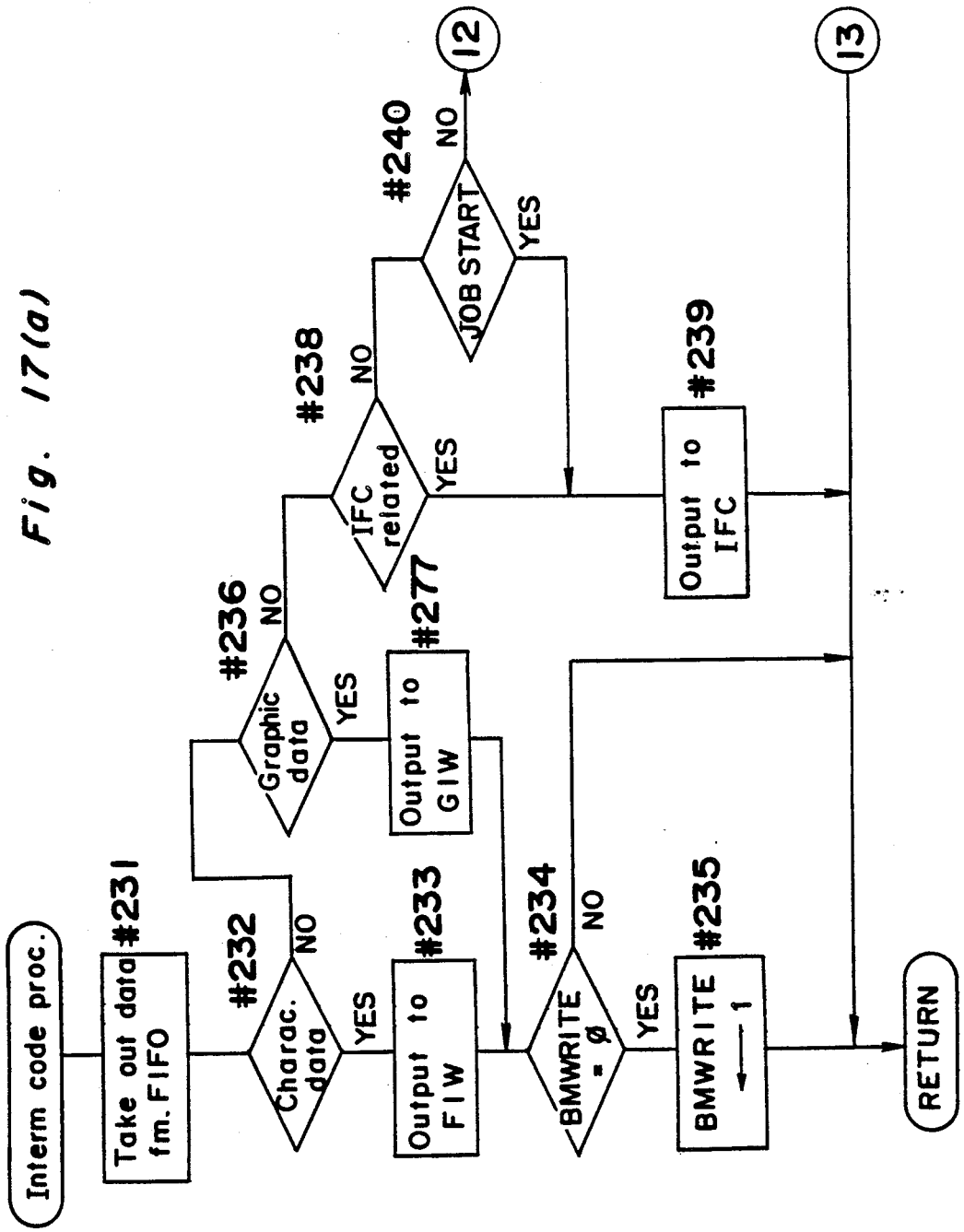
Figure 17B:
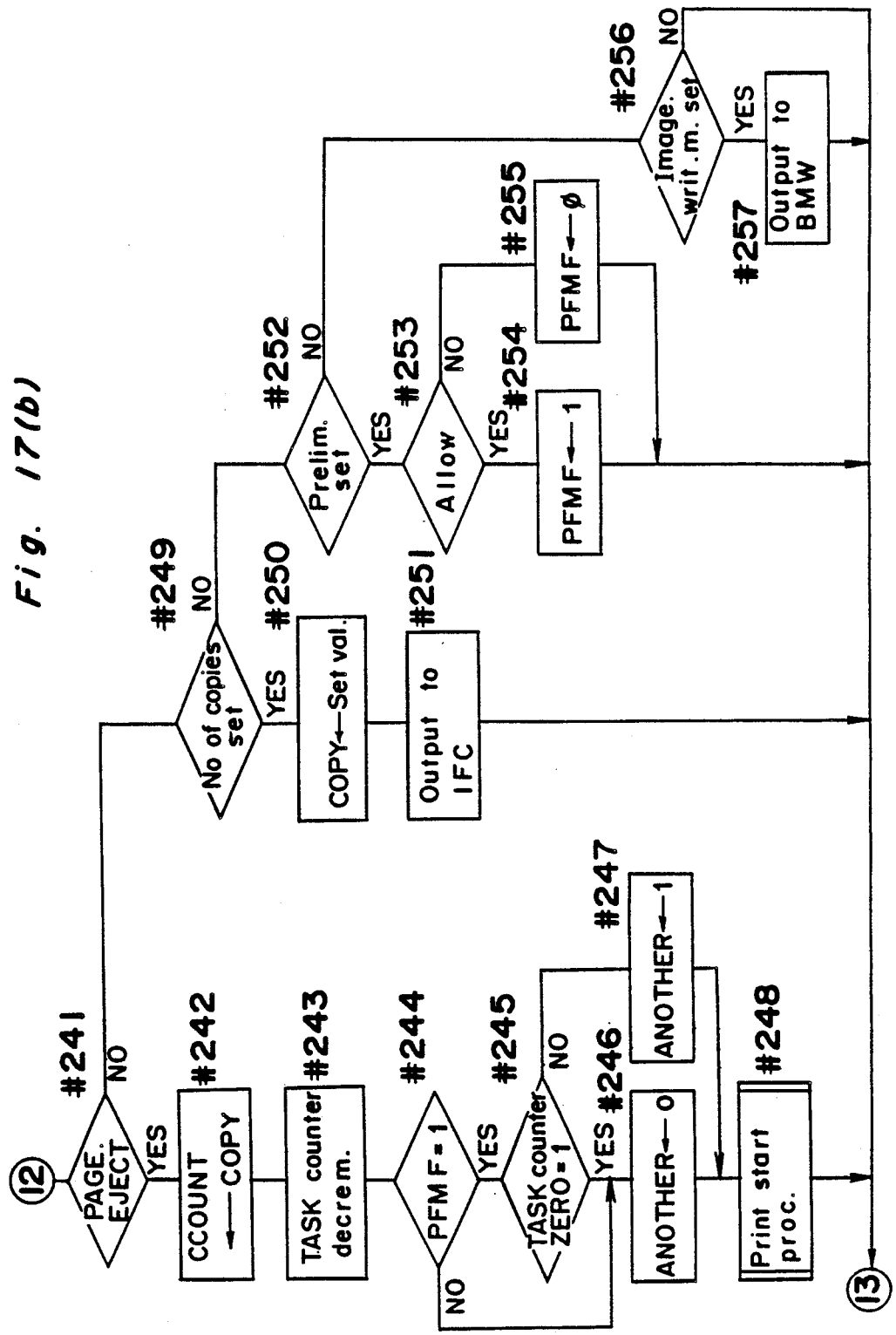
Figure 18:
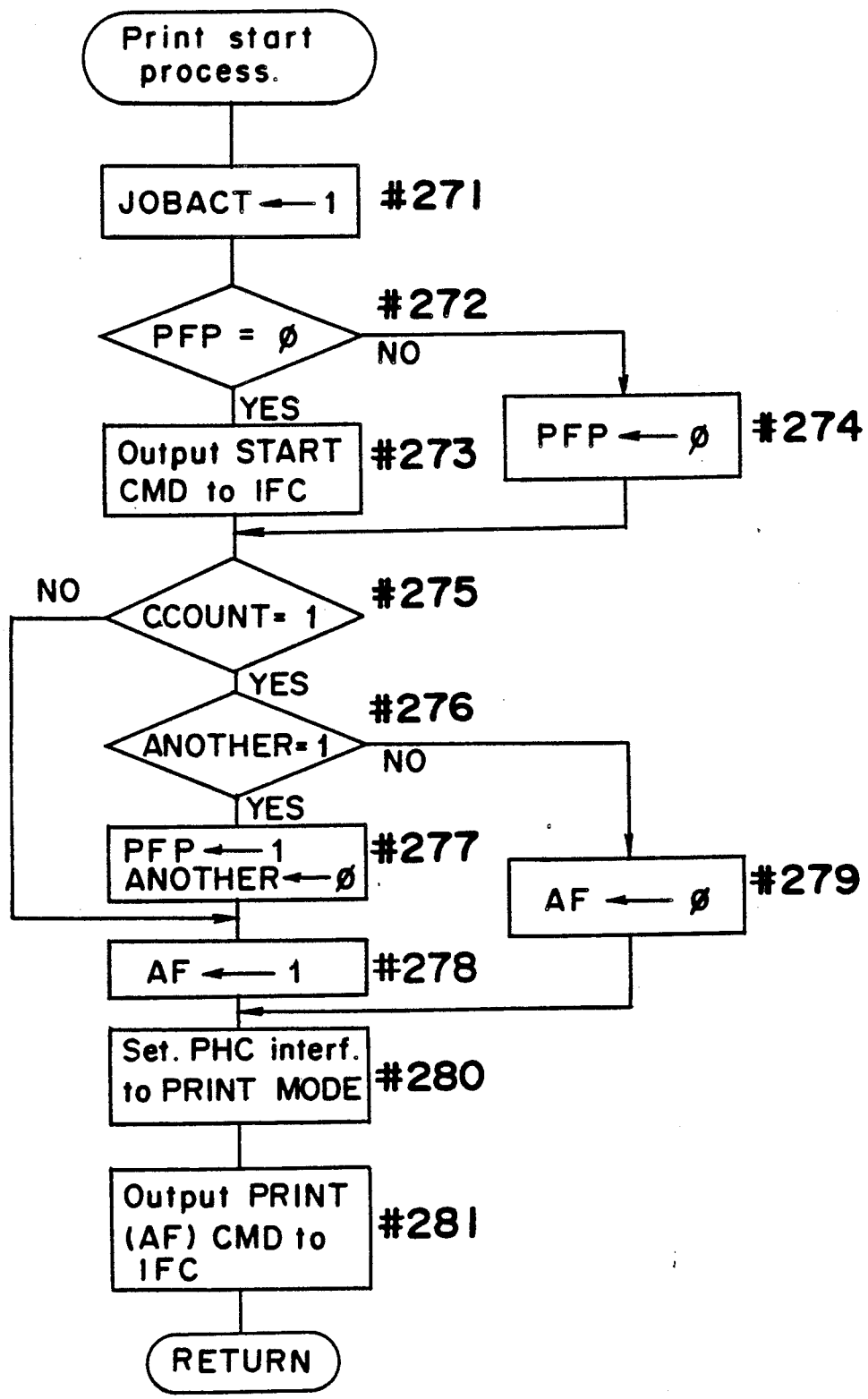
Figure 19A:
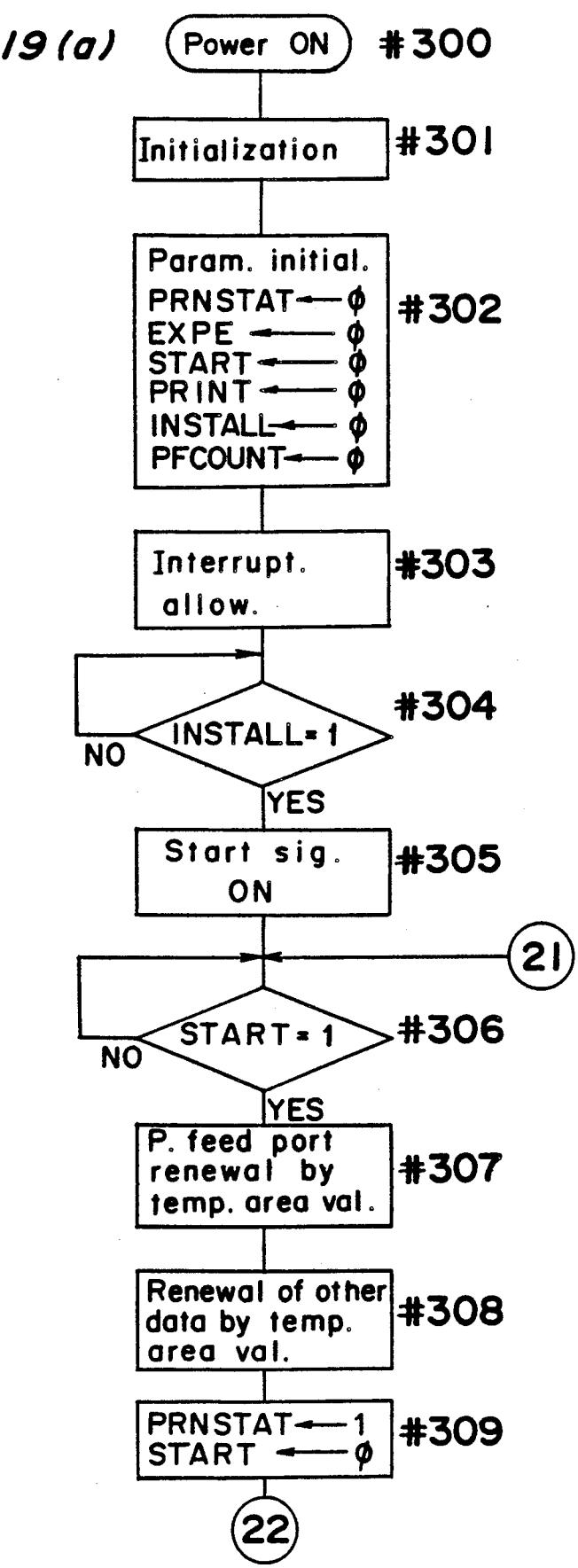
Figure 19B:
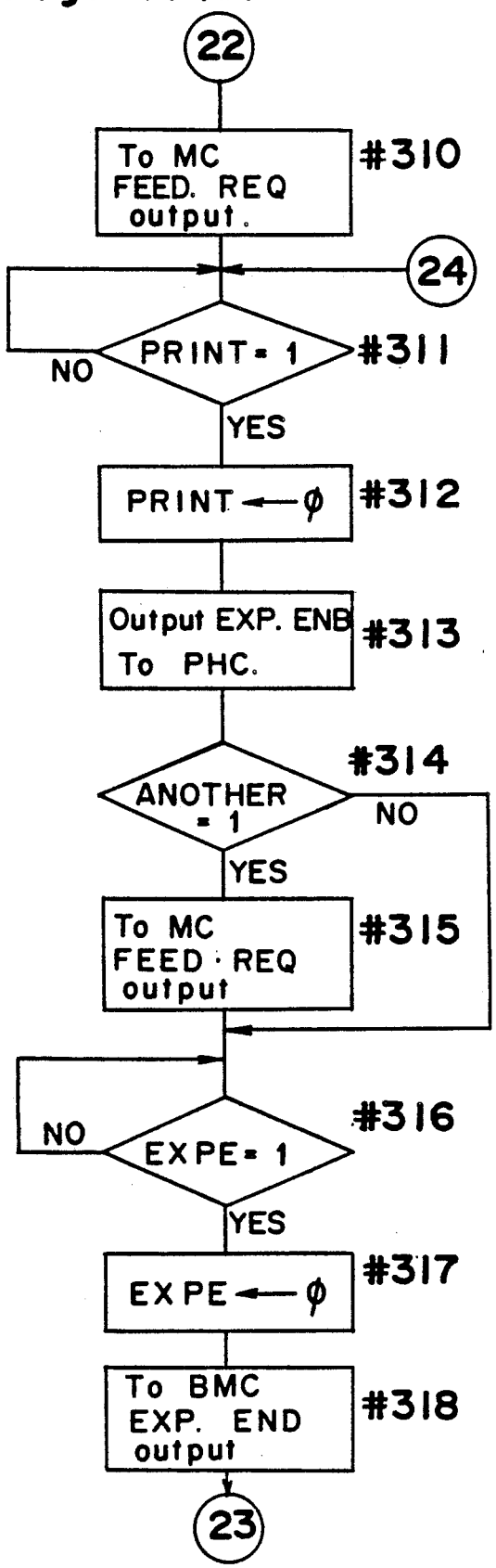
Figure 19C:
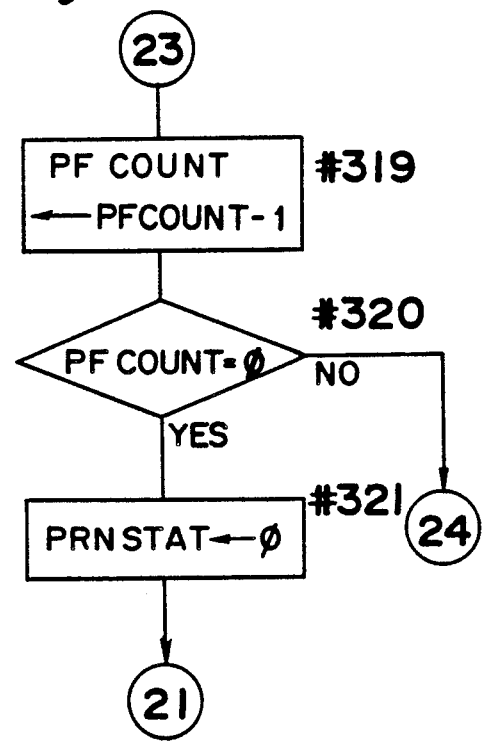

FIGS. 16 to 18 show respective flow charts of routines to be executed by the second information processor 330.

In FIG. 16 showing a main flow, when the power is turned on at Step #200, an internal initialization is done at Step #201, the BM-RAM 32 is cleared at Step #202 and following control flags are initialized at Step #203. Concretely, JOB ACT flag for indicating a printing state and BM-WRITE flag for indicating an imaging state to the BM-RAM 32 are cleared, COPY flag for indicating a number of copies for the same page is set at "1" and a copy counter CCOUNT for counting the number of copies for the same page is set at "1". PFMF flag for allowing the preliminary feeding of the copy paper sheet is set at "1", ANOTHER flag indicating that the next page information to be preliminarily fed is stored in the FIFO 305 is set at "0", and PFP flag indicating that the copy paper sheet is preliminarily fed is set at "0".

After the initialization of these flags, the process enters into the main routine which includes an analysis for intermediate codes and image writing to the BM-RAM 32, a print sequence control, and a preliminary paper feeding processing.

As an outline of the main routine, in the first place, when the printing is not being effected, i.e. when data is present in the FIFO 305 (YES at Step #219) during non-use of the BM-RAM 32 (NO at Step #218), image writing processing is effected to the BM-RAM 32 according to the intermediate code of the FIFO (Step #220).

Upon detection of PAGE.EJECT indicating termination of processing for a page, printing function is entered. During the printing (YES at Step #204), control of multicopy print is effected according to EXP.END (Step #205) indicating completion of laser exposure from the IFC 40 of the print engine 4. During the multi-copy print (NO at Step #207), repetition of printing is effected by the same image (Steps #211 to #217). At the end of the single print or multi-copy print, the BM-RAM 32 is cleared (Steps #208, #209) to terminate the printing (Step #210).

Starting of printing for the engine (IFC) includes START command for requesting starting of paper feeding and processing, and PRINT command for requesting starting of image exposure. Even in the PRINT command, it is possible to request the paper feeding by an AF flag, and during the multi-print, this flag is employed (Step #212).

In the case of normal multi-copy print, if the remaining number of copies is other than "1" (YES at Step #211), PRINT command added with the paper feeding request (AF=1) is outputted to effect the next printing (Step #217), but for the last print (NO at Step #211), the paper feeding request is not made (Step #213). However, in the case where the preliminary paper feeding is to be performed ANOTHER=1, Step #214), THE PAPER FEEDING REQUEST is effected even at the last time (Steps #215, #212). In this case, the PFP flag showing presence of the preliminarily fed paper sheet is set, with ANOTHER flag being cleared (Step #215).

<Intermediate code processing>

FIGS. 17(a) and 17(b) show a flow chart of the processing for intermediate codes stored in the FIFO 305.

At first, an intermediate code having been stored in the FIFO 305 is read out at Step #231. If it is a character data, it is outputted to the font image writer 316 at Step #233. If it is a first data to be written, the BMWRITE flag indicating writing in the BM-RAM is set (Step #235).

In the case of the IFC related code (at Step #238) or of JOB START code (at Step #240), the code is outputted to the interface controller 40 at Step #239.

Upon detection of PAGE.EJECT (Step #241), print starting is initiated. As a preparation, the present set value COPY is first set at the CCOUNT for the multi-print counting (Step #242), and the TASK counter 303 is decremented (Step #243). Subsequently, in the case where the mode is of the preliminary paper feeding mode (YES at Step #244), with the next page information being prepared in the FIFO (NO at Step #245), ANOTHER flag is set (Step #247). In the cases other than the above, the state of inhibition is established (Step #246). After such preparation, the print starting processing is entered (Step #248, FIG. 18).

For setting the number of copies, set value COPY is renewed and the output is effected to the IFC 40 for the optional control, etc. (Steps #249 to #251). In the case of the preliminary feeding setting, the mode flag setting is renewed (Steps #252 to #255). For the setting of the image writing mode, output is effected to the BM writer 31 and the writing mode is renewed (Steps #256, #257).

Reference is also made to FIG. 18 showing a flow-chart for the print starting processing.

Firstly, a JOBACT flag indicating that the printing is being effected is set (Step #271), and processing for the subsequent intermediate code is suspended up to the termination of printing. Then, the processing for starting the print engine portion is effected (Steps #272 to #274). In the case of the first starting (PFP =1, Step #272), START command is not outputted, and resetting of the PFP flag is effected.

Subsequently, the printing function accompanied by the laser exposure is started (Steps #275 to #281).

The sequence for starting the printing function may be generally divided into the following three cases.
(i) the case where the multi-copying is not executed, and where the preliminary paper feeding is not effected due to absence of next page information.
(ii) the case where the multi-copying is not executed, but the preliminary paper feeding is effected.
(iii) the case where the multi-copying is effected.

Even in the case of the above item (iii), the preliminary paper feeding may involved or not involved in some cases, and the judgment thereof is effected at the completion of the multi-copying (Steps #211 to #217).

Firstly, in the case of the above item i), an ordinary PRINT command (AF =0) not requesting the preliminary feeding of the next paper sheet, is outputted after setting of the print head controller interface 315 to the print mode (Steps #275, #276, #279, #280, #281).

In the case of the above item ii), PFP flag is set (Step #277) in order to omit the subsequent engine starting, and PRINT command in which the preliminary feeding request (AF=1) is set, is to be outputted (Steps #275 to #278, #280, #281).

In the case of the above item iii), only the preliminary feeding request is set without setting PFP flag (Steps #275, #278, #280, #281).

FIGS. 19(a) to 22 show flow-charts for the processings by the interface controller (IFC) 40.

At the IFC 40, after the internal initialization (Step #301), respective flags are also initialized. Functions of the respective flags are as follows.
PRNSTAT : during printing.
EXPE : detection of exposure completion at PHC.
START : detection of START command from BMC.
PFCOUNT : number of paper sheets preliminarily fed.
INSTALL : completion of initial check of the print engine 4.

After initialization of the above flags the interruption processing is allowed (Step #303). It is to be noted here that the interruption includes the bit map (BM) controller interruption for receiving commands, etc. from the BM controller 30, system timer interruption for effecting control or timer processing for the operation panel 44, and interruption of bus B5 in the print engine. Subsequently, if the print engine is normal (INSTALL =1, Step #304), starting signal is applied to the sorter 6, external paper feeding unit 5, electrophotographic controller 41 and PH controller 42 through the bus B5 (Step #305) for transfer into the processing loop.

Presence or absence of any trouble at the print engine 4 is checked by the system timer interruption, and at the main routine, can be ensured by INSTALL flag.

Before the description of the processing loop, the three interruption processings will be explained.

In the first place, the BM controller interruption (FIG. 21) will be described.

In the BM controller interruption, receiving processing of the command fed from the BM controller 30 are effected. Specifically, in the BM controller interruption, the received command is not directly executed, but the flag in the interface controller is only set, and the actual processing is effected when this flag is detected in the processing loop. This arrangement is intended to simplify the construction of the processing loop by making asynchronous, the communication between the processing loop and the BM controller 30. Similarly, in the case of mode information of the print or accessories (Step #364), such information is once stored in the temporary area (Step #365) so as to be formally taken in within the processing loop.

Figure 20A:
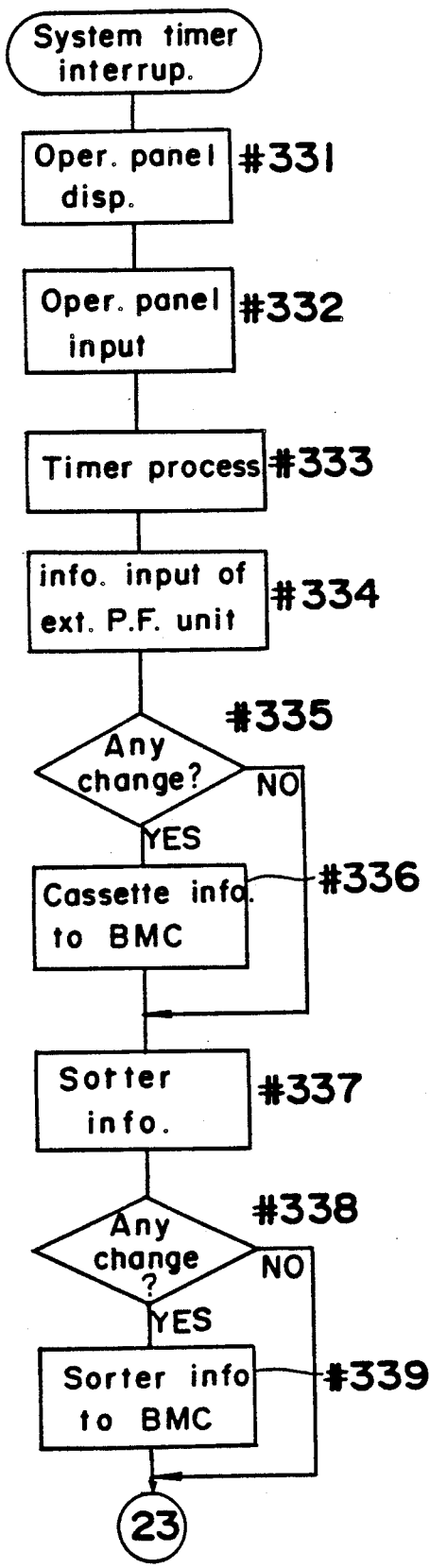
Figure 20B:
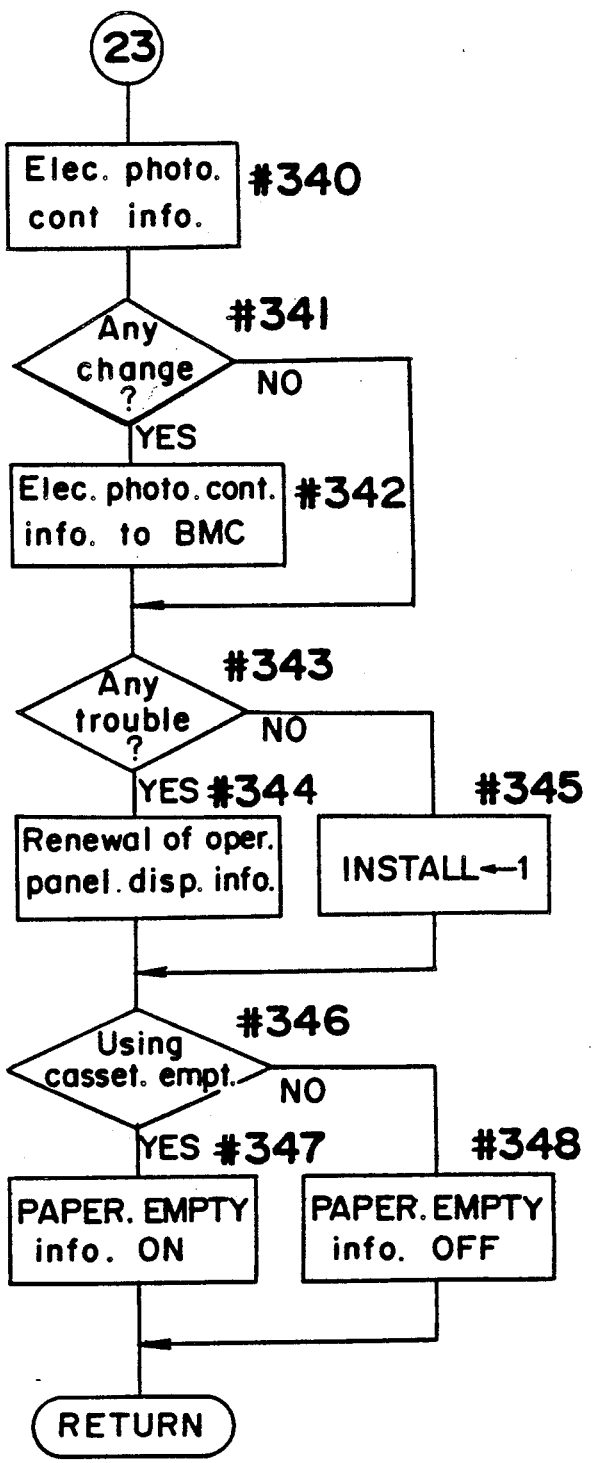

Subsequently, the system timer interruption will be described with reference to FIGS. 20(a) and 20(b).

Figure 22:
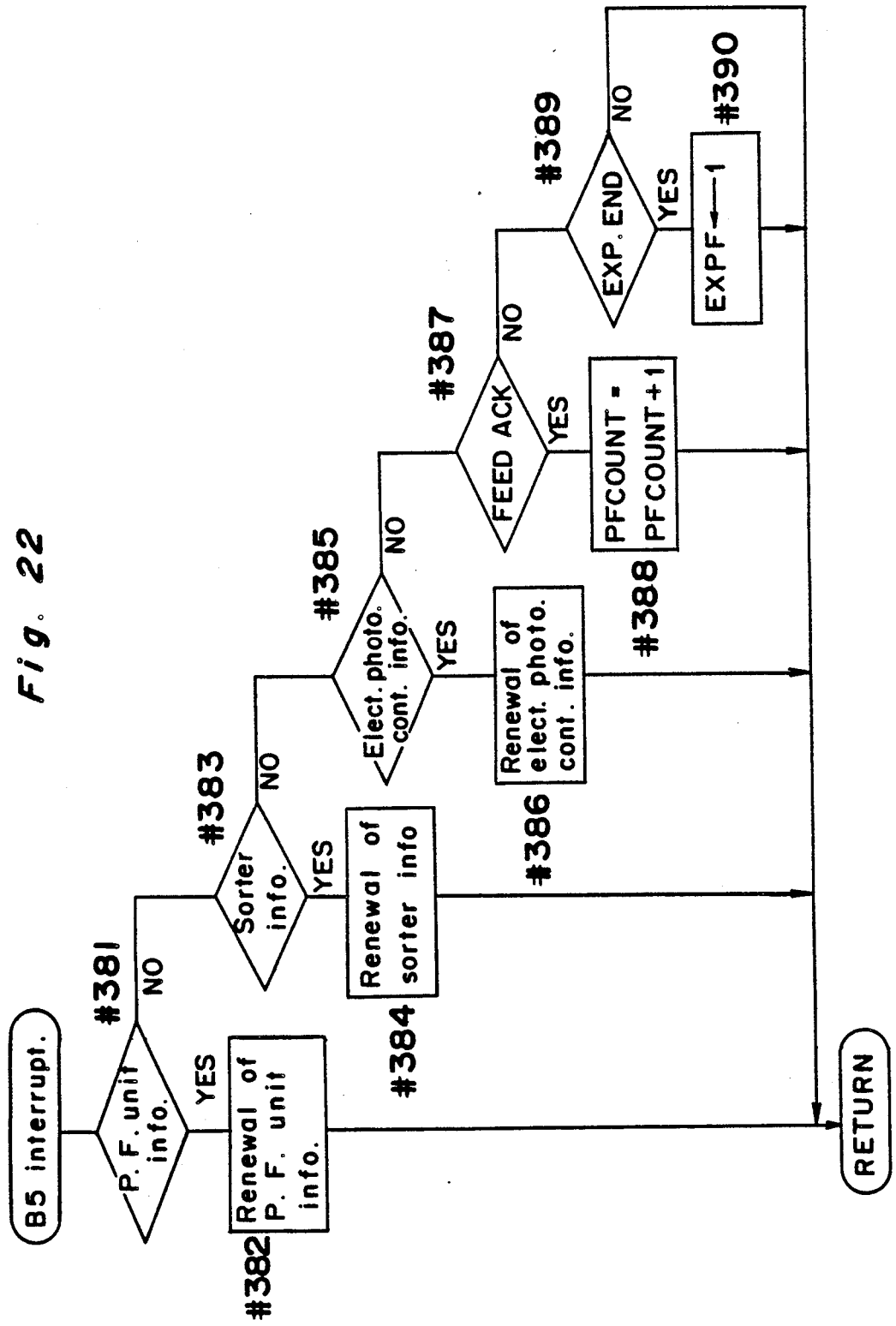

In the system timer interruption, input and output processings of the operating panel 44 (Steps #331, #332), count processing of the timer set in the processing loop (Step #333), and checking of the state at each part of the print engine are effected (Steps #334 to #342), and if there is any change to be notified to the BM controller 30, it is outputted to said BM controller (Steps #334 to #336). Moreover, checking is made for the presence or absence of trouble (Step #343), and if any trouble is present, it is displayed on the operating panel, while if not, INSTALL flag is set for notifying to the processing loop that the print engine 4 was checked to be normal (Step #345). FIG. 22 shows a flow-chart for the receiving interruption for the bus B5 within the engine. Similar to the BM controller interruption (FIG. 21), it is intended to establish the asynchronous relation between the processing loop (FIGS. 19(a) and 19(b)) and the communication processing.

The receiving data include unit information at various parts and timing signal for the sequence.

In the case of the unit information, the internal memorized value is renewed. FEED ACK (Step #387) is outputted when actual paper feeding is effected by the paper feeding response from the electro-photographic controller 41 or external paper supply unit 5, and in the IFC 40, the paper sheet which has already been preliminarily fed is counted (Step #387). EXP.END (Step #389) is the signal indicating completion of the laser exposure from the print head controller (PHC) 315, and notifies the state to the processing loop by setting EXPE flag.

Referring back to FIGS. 19(a) to 19(c), description of the Processing loop will be continued hereinafter.

At the first stage of the processing loop, the state is for the start waiting (Step #306), and upon detection of START flag, the cassette paper feeding port (Step #307) and optical mode information (Step #308) are renewed by temporary values for setting at the various parts through the bus B5, thereby to establish the print state (PRNSTAT=1) (Step #309). Thereafter, in order to effect the first printing, the paper feeding request signal (FEED. REQ.) is applied to the electro-photographic controller 41 through the bus B5 (Step #310), whereby the electro-photographic controller 41 causes the electro-photographic processor 45 for the paper feeding and printing to start. However, the paper takes a stand-by state at a predetermined stopping position after having been fed. Meanwhile, at the electrophotographic controller 41, FEED ACK is outputted as a response, and upon receipt thereof at the IFC 40, the counter PFCOUNT for the preliminarily fed paper sheet is incremented (Steps #387 and #388, FIG. 22). In the case where the external paper feeding unit 5 is designated, however, the electro-photographic controller 41 starts only the electro-photographic processor 45, and the paper feeding is effected by the external paper supply unit 5. It is to be noted here that the stand-by position of the paper is the same in this case also.

Thus, the interface controller (IFC) 40 awaits an occurrence of PRINT command (PRINT=1 Step #311)

When PRINT command is issued, this flag is reset (Step #312), and EXPENB signal for allowing exposure is outputted to the print head controller (PHC) 42 (Step #313), whereby the actual exposure is effected at the print head controller 42.

Meanwhile, ANOTHER flag set by AF flag of PRINT command Steps #368 to #371, FIG. 21) is checked (Step #314), and in the case where the preliminary paper feeding with respect to the next PRINT command is requested from the BM controller 30, the paper feeding request (FEED.REQ) is outputted (Step #315). At this time, there is a case where output is continuously effected to Step #310, but the actual paper feeding interval is to be adjusted by the electrophotographic controller 41.

After completion of the exposure, the preliminary feeding paper counter PFCOUNT is decremented (Step #319), and it is checked whether or not the paper preliminarily fed is still remaining (Step #320). If it is remaining, the next PRINT command waiting state is established (Step #311). On the other hand, if it is not remaining the printing state is terminated (Step #321), and START command waiting state (Step #306) is established.

For changing over the paper feeding ports, etc., the printing state must be terminated, but in the case where the same paper feeding port is employed, the time for passing the paper from the paper feeding port (for the cassette) to the stand-by position may be reduced by preliminarily feeding the paper, with the printing state being continued, thus improving the through-put thereby.

It should be noted here that, in the foregoing embodiment, although the information processing section is described as divided into the first information processor, and second information processor, similar function can be obtained even when the information processing section is not divided into the two processors.

It should also be noted that, in the foregoing embodiment, although the condition for effecting the preliminary paper feeding is determined based on whether or not the next page information including PAGE.EJECT has been inputted to the FIFO 305, this may be so modified, for example, that the preliminary paper feeding is effected at a time point when even one of the next page information is inputted, in which case, however, when the data input is suspended during the processing, the paper sheet undesirably remains in the print engine.

It is to be further noted that in the foregoing embodiment, the preliminary paper feeding is possible even when PAGE.EJECT is arranged to be checked during the data reception before conversion into the intermediate code, but in this case, since checking by pre-editing is not effected, it becomes impossible to inhibit the output for a blank paper sheet.

As is clear from the foregoing description, according to the present invention, since it is so arranged that the preliminary paper feeding is effected in the case of normal printing, and upon alteration of printing conditions, the preliminary paper feeding is automatically released, while after alteration of the printing conditions, the preliminary paper feeding is again effected, a printer efficient in use, with an improved through-put can be advantageously presented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A printer employing an electrophotographic process, which comprises:
   means for receiving data to be printed;
   a converting means for converting the received data into bit image so as to be stored in a memory;
   a print section including a photosensitive member and a paper supply section for effecting printing by transferring an image formed on the photosensitive member onto a paper sheet fed from the paper supply section;
   an output means for outputting the bit image stored in the memory to said print section;
   means for generating a paper feeding request for feeding the paper sheet from the paper supply section, to a predetermined stopping position in the vicinity of the image transfer position;
   an instructing means for instructing alteration of printing conditions;
   a control means for controlling in such a manner as to start said paper feeding request generating means before completion of processing by said converting means and to start said output means upon completion of the processing by said converting means, and
   a cancel means for canceling said paper feeding request when an alteration of the printing conditions is instructed by said instructing means, whereby the paper sheet is not fed from the paper supply section before completion of the processing by said converting means.

2. A printer as claimed in claim 1, further comprising a second control means arranged to control in such a manner as to start said paper feeding request generating means and said output means after completion of the processing by said converting means, irrespective of the presence or absence of instruction from said instructing means.

3. A printer as claimed in claim 1, wherein said instructing means comprises a means for selecting one of a plurality of paper supply sections.

4. A printer comprising:
   a receiving means for receiving print data and control data;
   an analyzing means for analyzing the received data by said receiving means;
   a memory means for memorizing print data image;
   an image writing means for writing data image in said memory means according to a result of analysis by said analyzing means;
   a printing means for effecting printing;
   an output means for outputting the print data image stored in said memory means;
   a requesting means for requesting feeding of the printing medium to be used for the printing means to effect output of said output means, and
   a control means having a first mode for starting said requesting means and said output means after completion of the image writing by said image writing means, and a second mode for starting said requesting means before completion of the image writing by said image writing means and for starting said output means after completion of the image writing by said image writing means, and being so arranged that, in said second mode, the mode is temporarily changed over to said first mode by the output from said analyzing means so as to be again returned to said second mode upon termination of said output from said analyzing means.

* * * * *